Feb. 24, 1942.   W. A. WEIGHTMAN ET AL   2,274,020
FRUIT JUICE MACHINE
Filed Aug. 10, 1937   22 Sheets-Sheet 1

INVENTORS
WILLIAM A. WEIGHTMAN
WALTER HURLEMAN
BY
J. Calvin Bright
ATTORNEY.

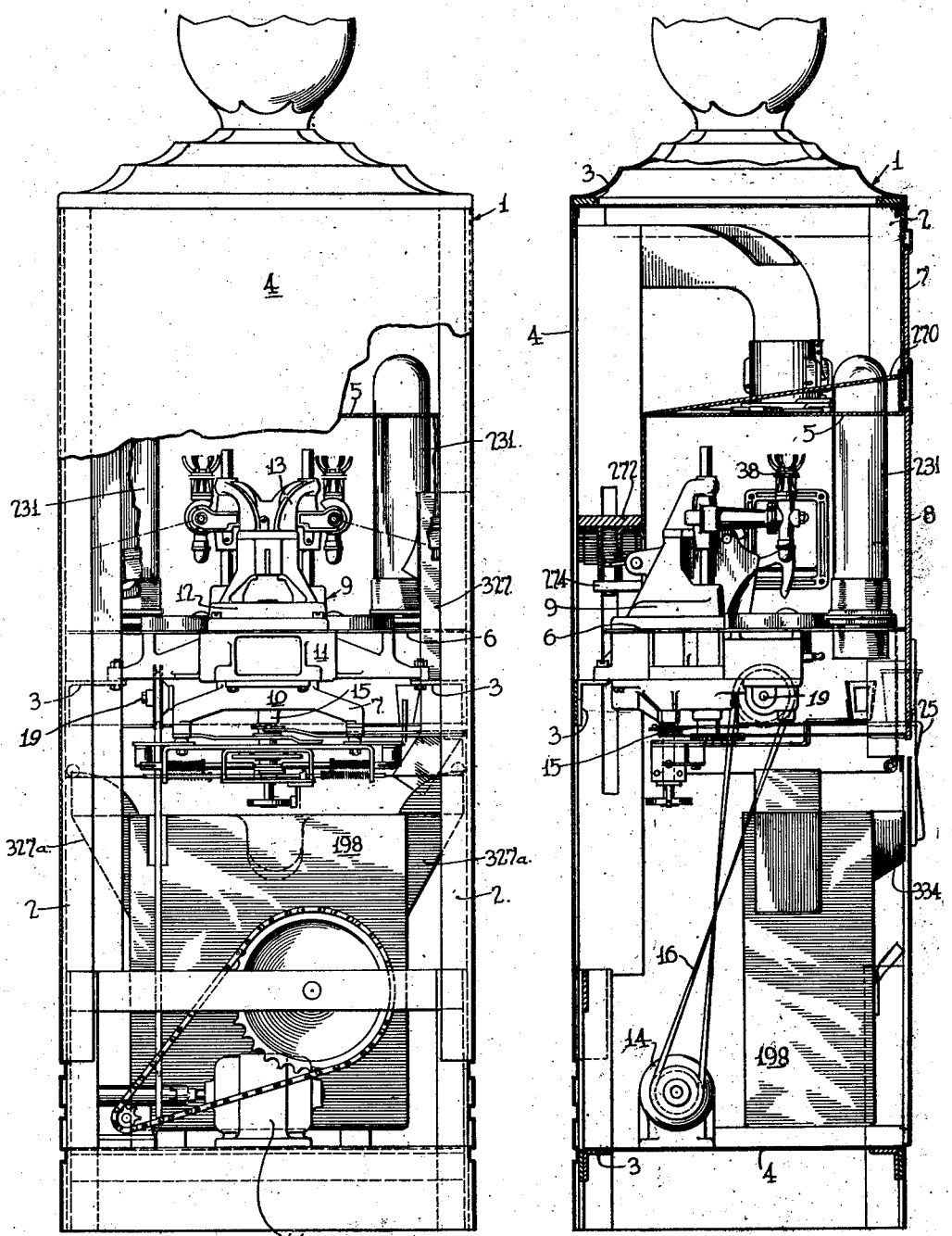

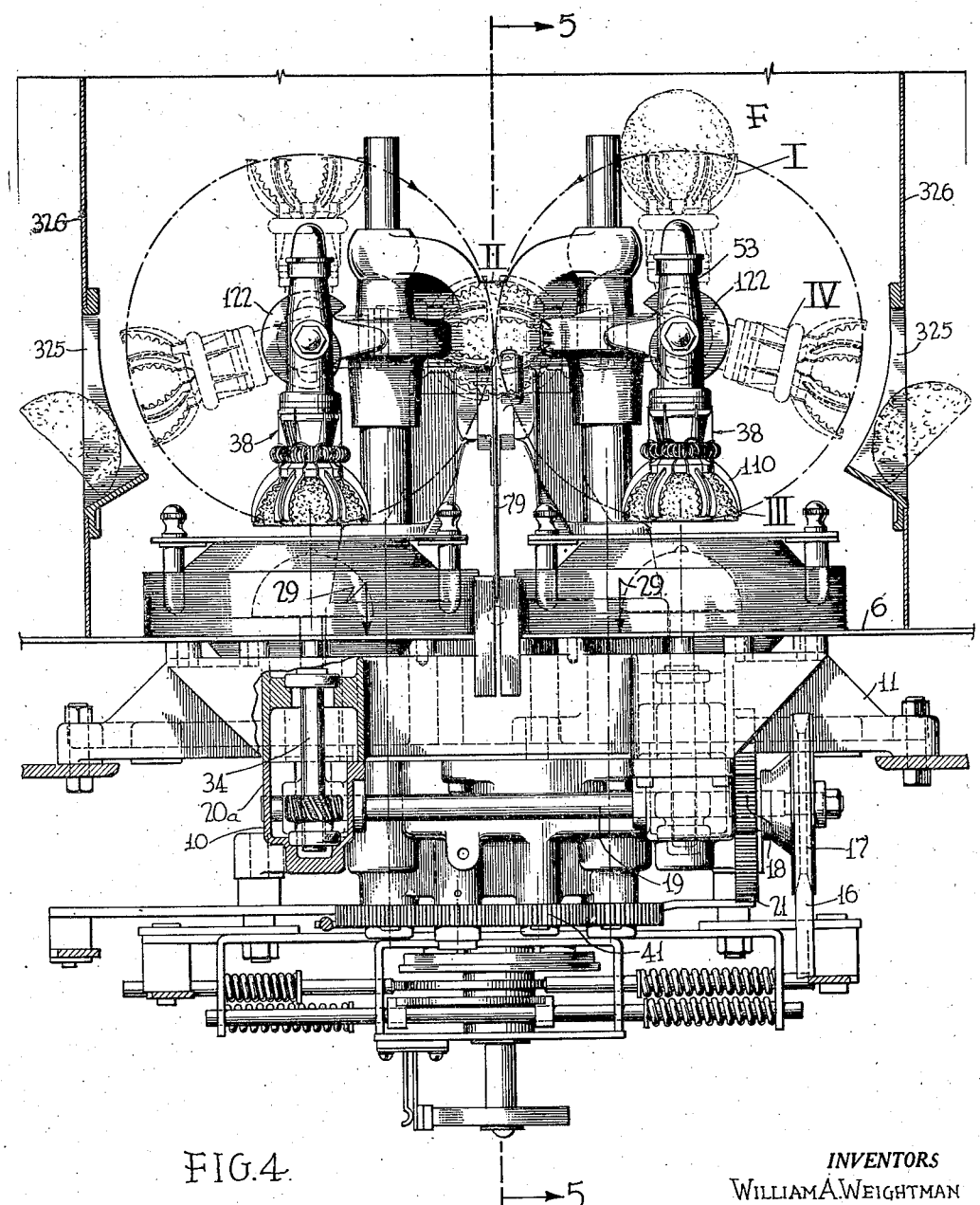

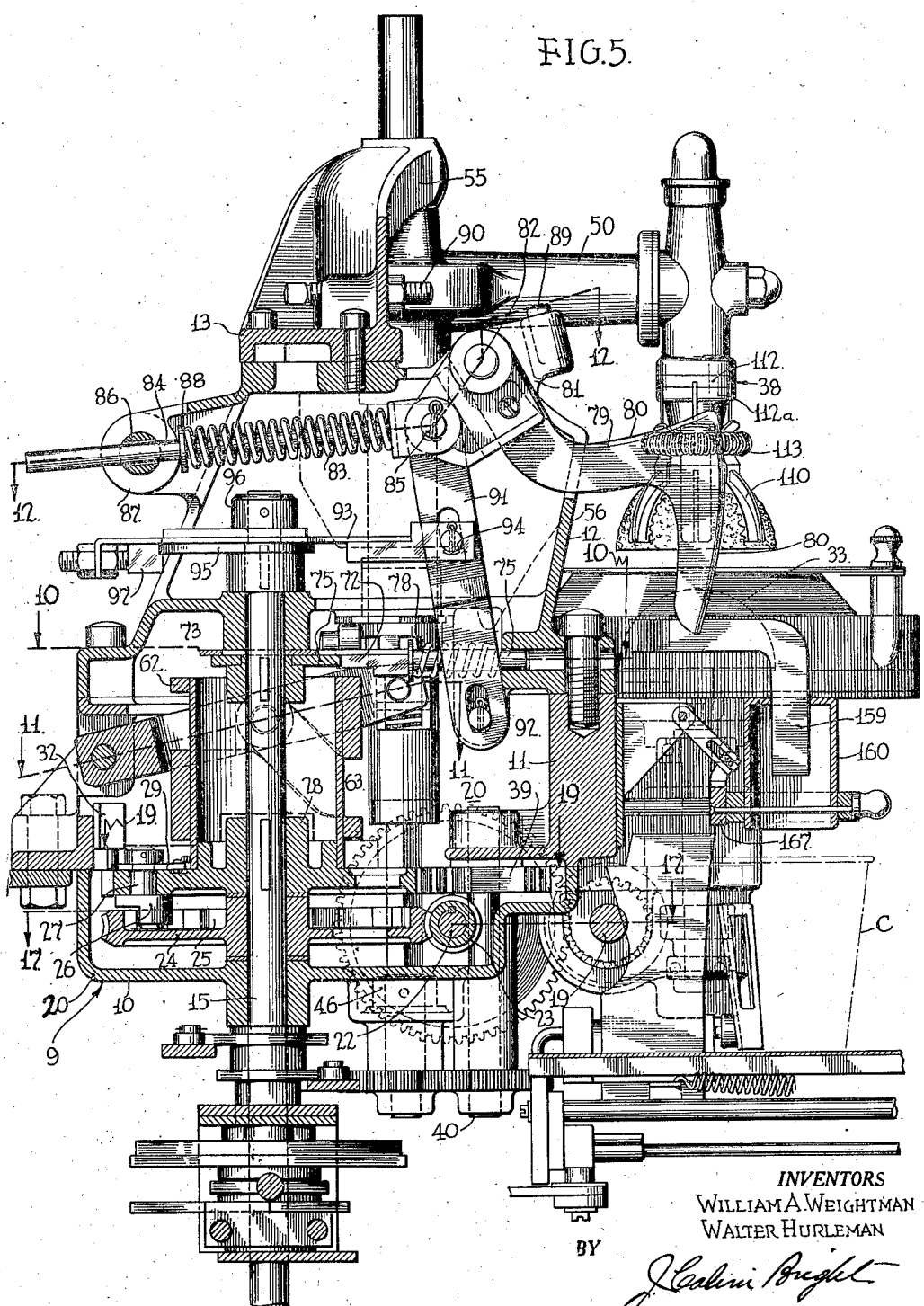

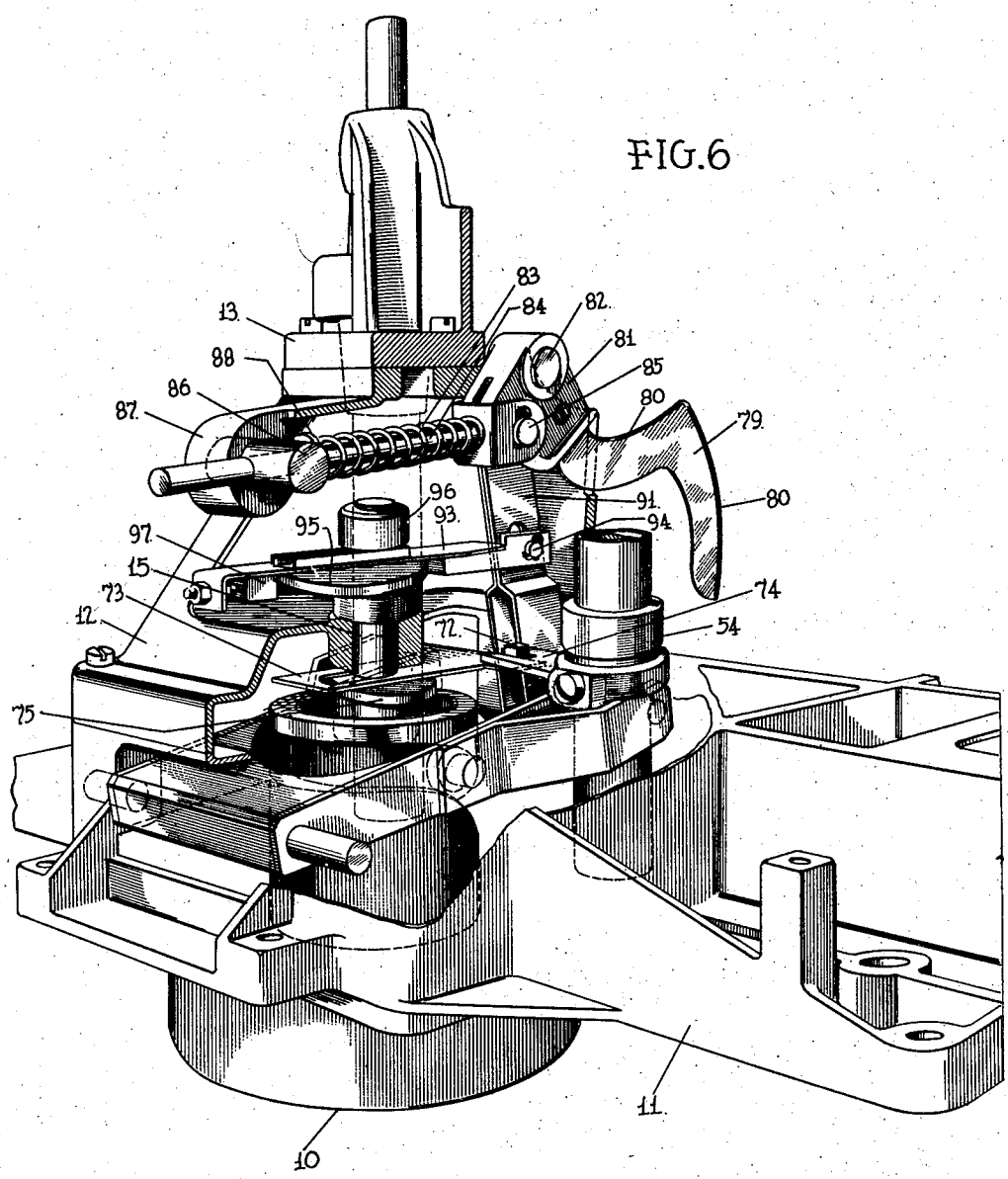

Feb. 24, 1942. W. A. WEIGHTMAN ET AL 2,274,020
FRUIT JUICE MACHINE
Filed Aug. 10, 1937 22 Sheets-Sheet 6

INVENTORS
WILLIAM A. WEIGHTMAN
WALTER HURLEMAN.
BY
J. Calvin Bright
ATTORNEY.

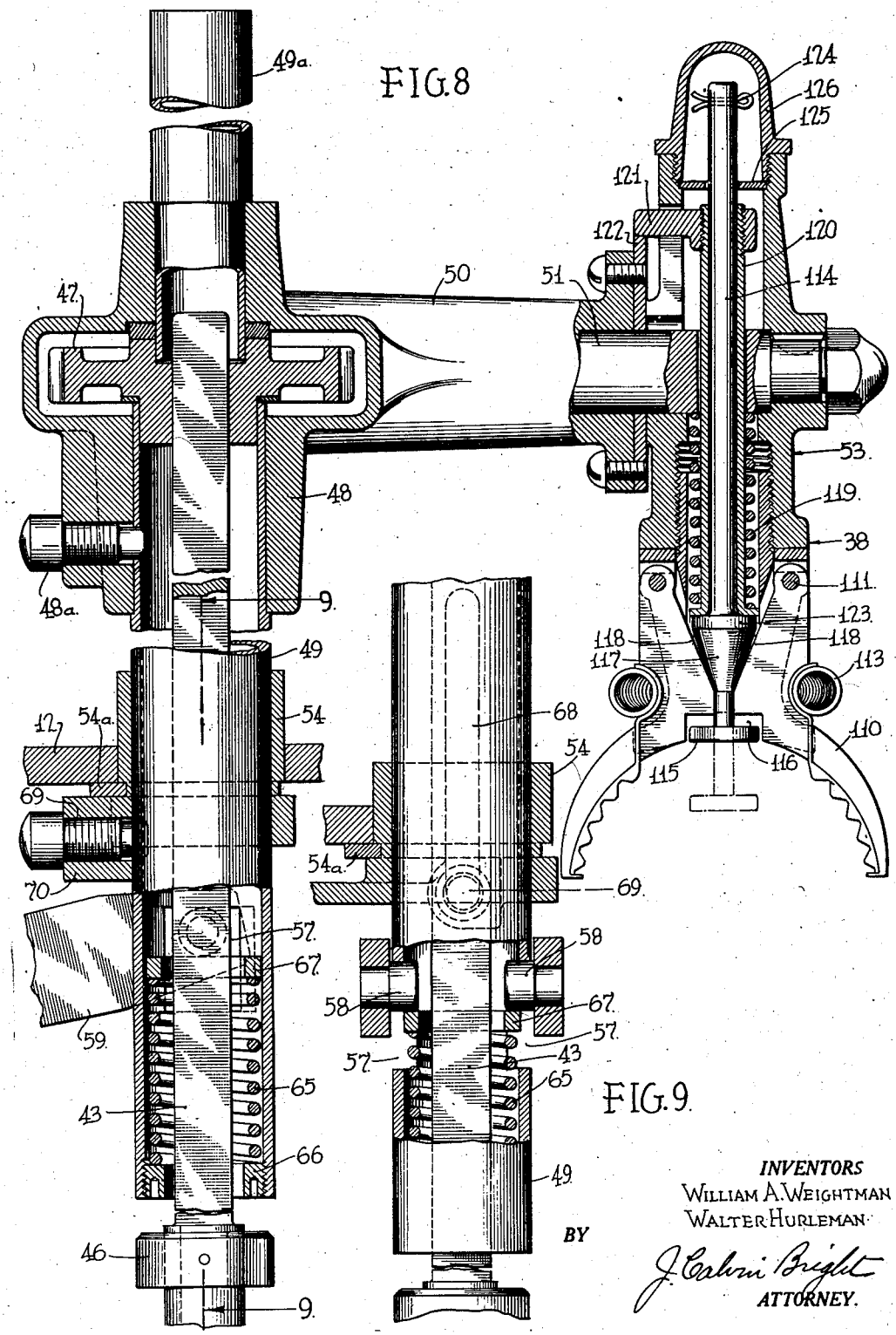

Feb. 24, 1942.   W. A. WEIGHTMAN ET AL   2,274,020
FRUIT JUICE MACHINE
Filed Aug. 10, 1937   22 Sheets-Sheet 8

INVENTORS
WILLIAM A. WEIGHTMAN
WALTER HURLEMAN
BY
J. Calvin Bright
ATTORNEY.

Feb. 24, 1942.   W. A. WEIGHTMAN ET AL   2,274,020
FRUIT JUICE MACHINE
Filed Aug. 10, 1937   22 Sheets-Sheet 9
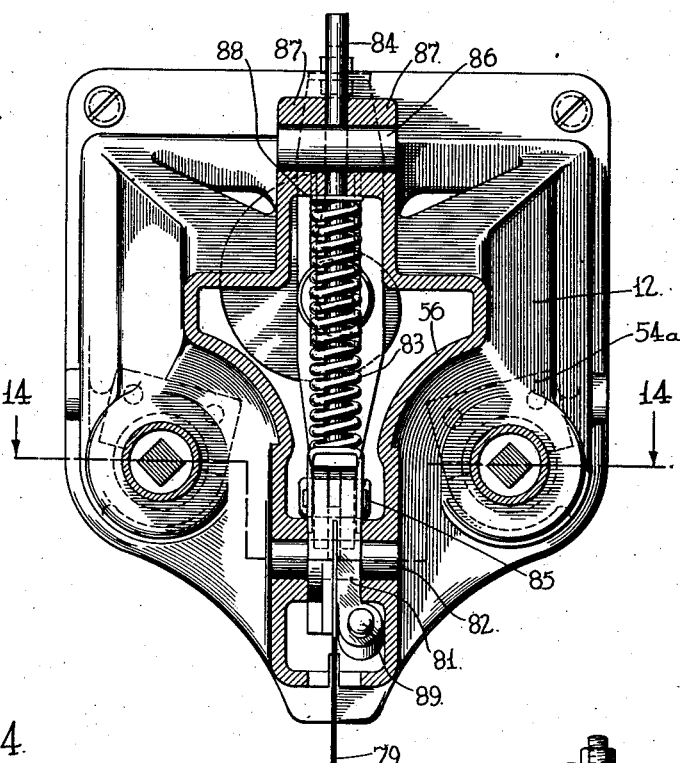
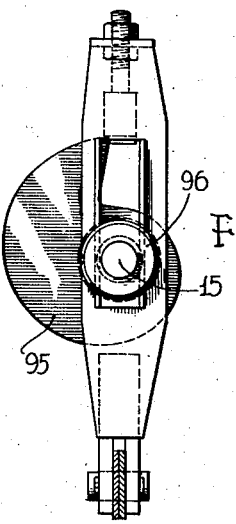
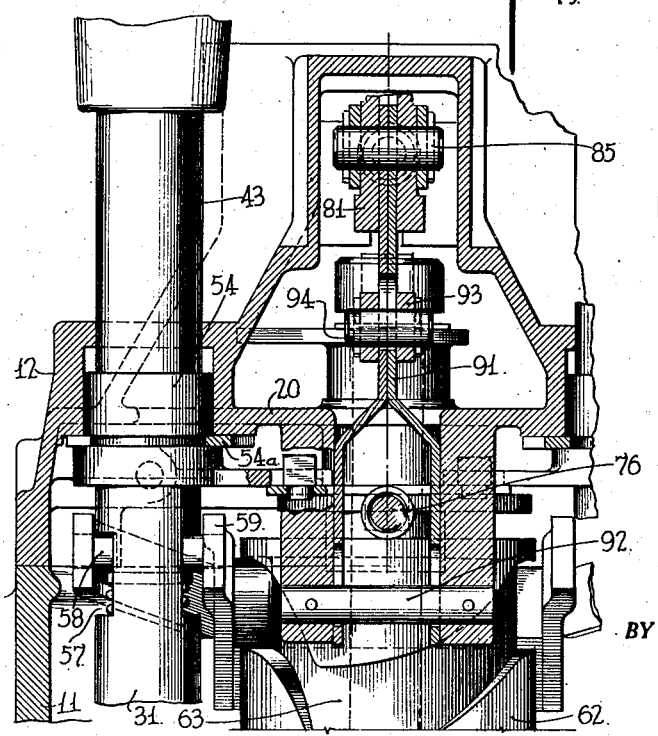
INVENTORS
WILLIAM A. WEIGHTMAN
WALTER HURLEMAN
BY
ATTORNEY.

INVENTORS
WILLIAM A. WEIGHTMAN
WALTER HURLEMAN
BY J. Calvin Bright
ATTORNEY.

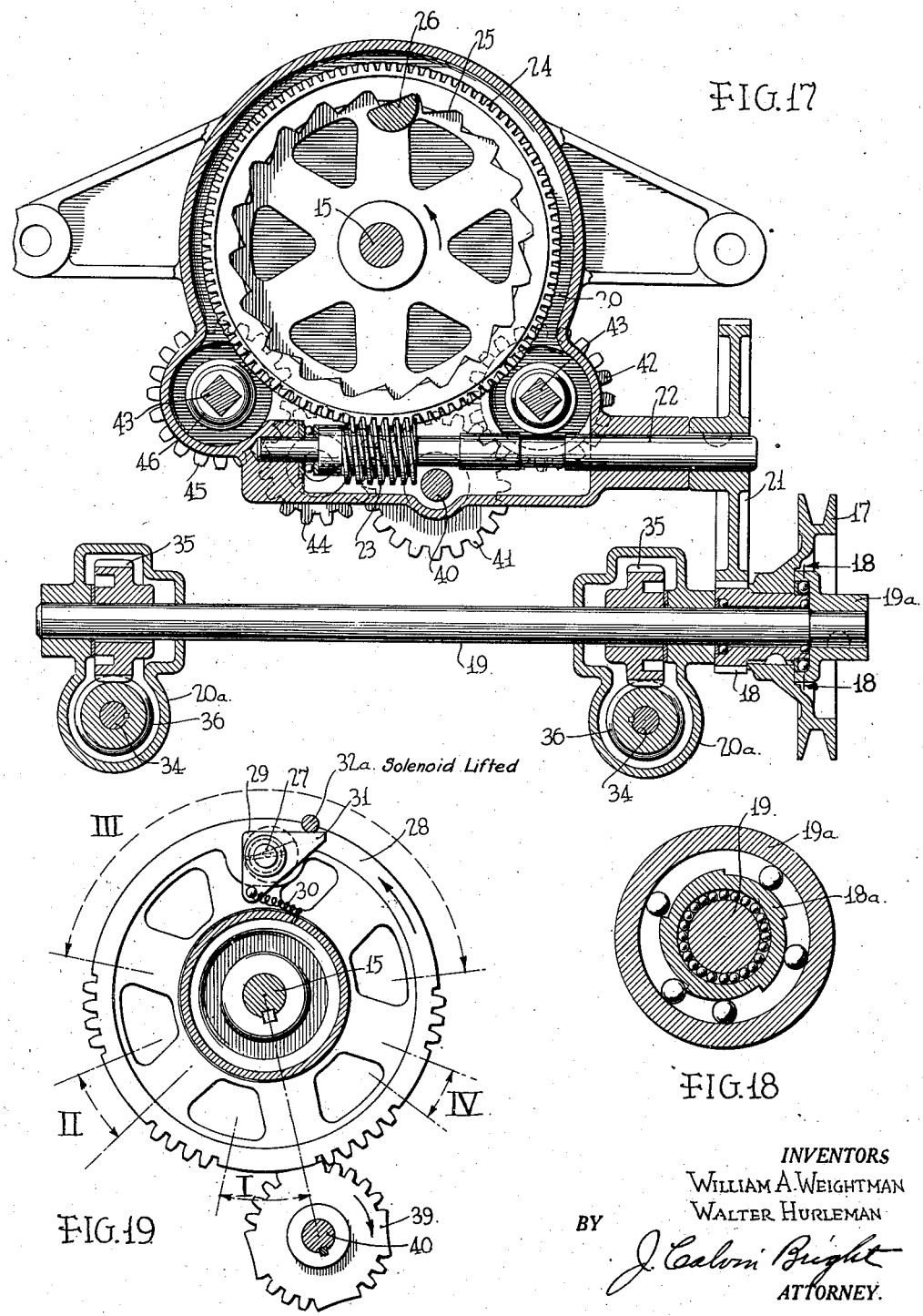

Feb. 24, 1942.  W. A. WEIGHTMAN ET AL  2,274,020
FRUIT JUICE MACHINE
Filed Aug. 10, 1937  22 Sheets-Sheet 12

INVENTORS
WILLIAM A. WEIGHTMAN
WALTER HURLEMAN
BY
ATTORNEY

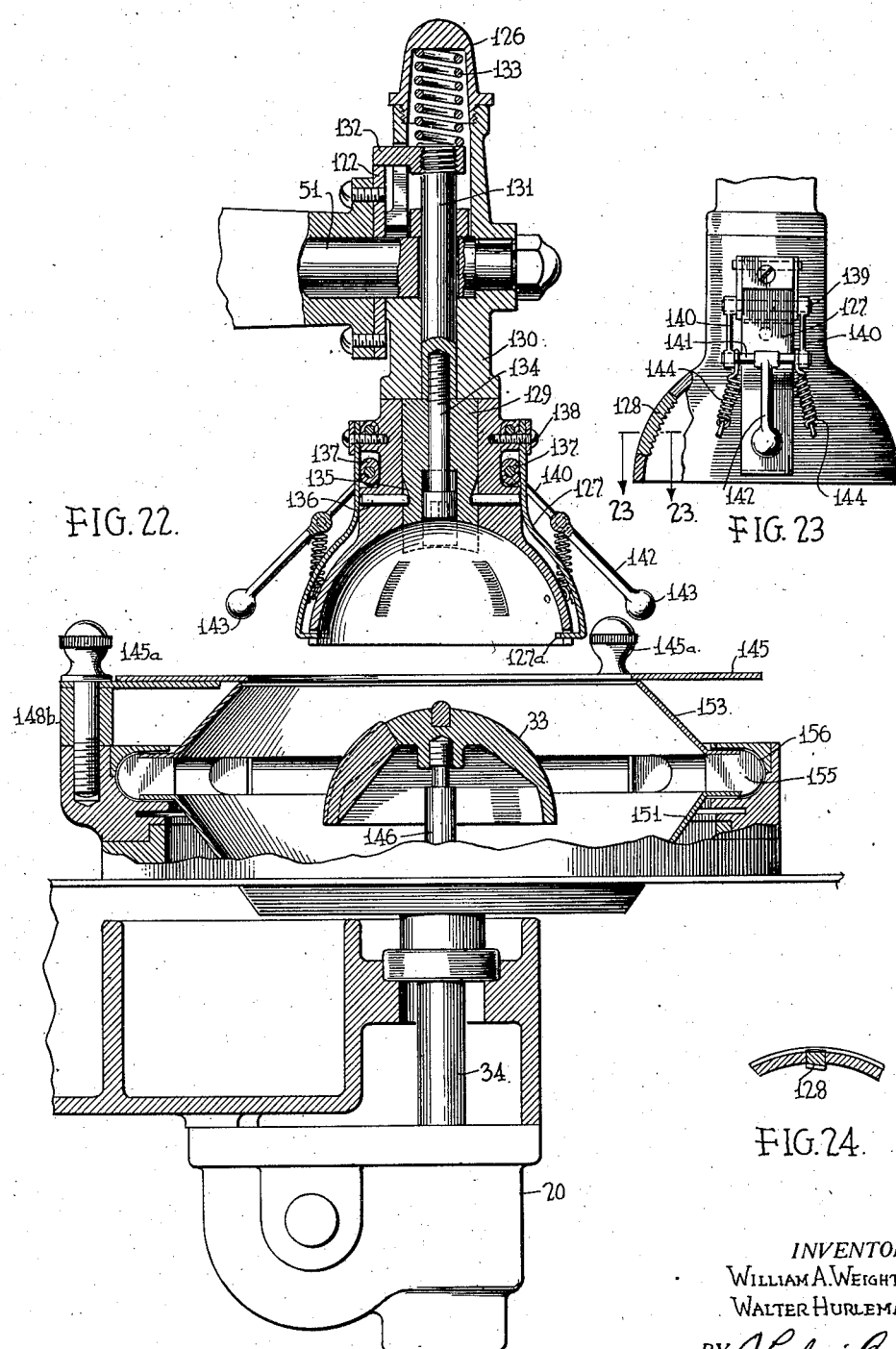

Feb. 24, 1942.  W. A. WEIGHTMAN ET AL  2,274,020
FRUIT JUICE MACHINE
Filed Aug. 10, 1937  22 Sheets-Sheet 14
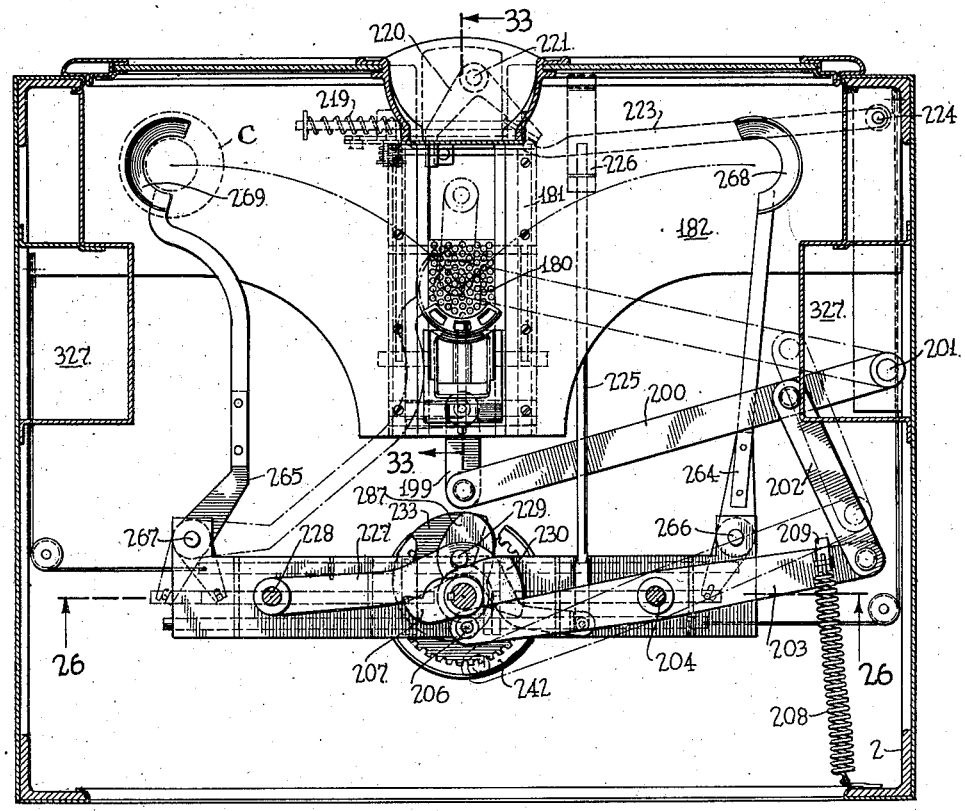
FIG.25
FIG.27
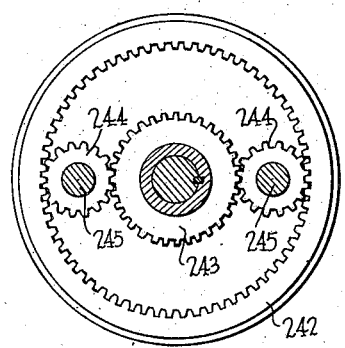
INVENTORS
WILLAM A. WEIGHTMAN
WALTER HURLEMAN.
BY
J. Calvin Bright
ATTORNEY.

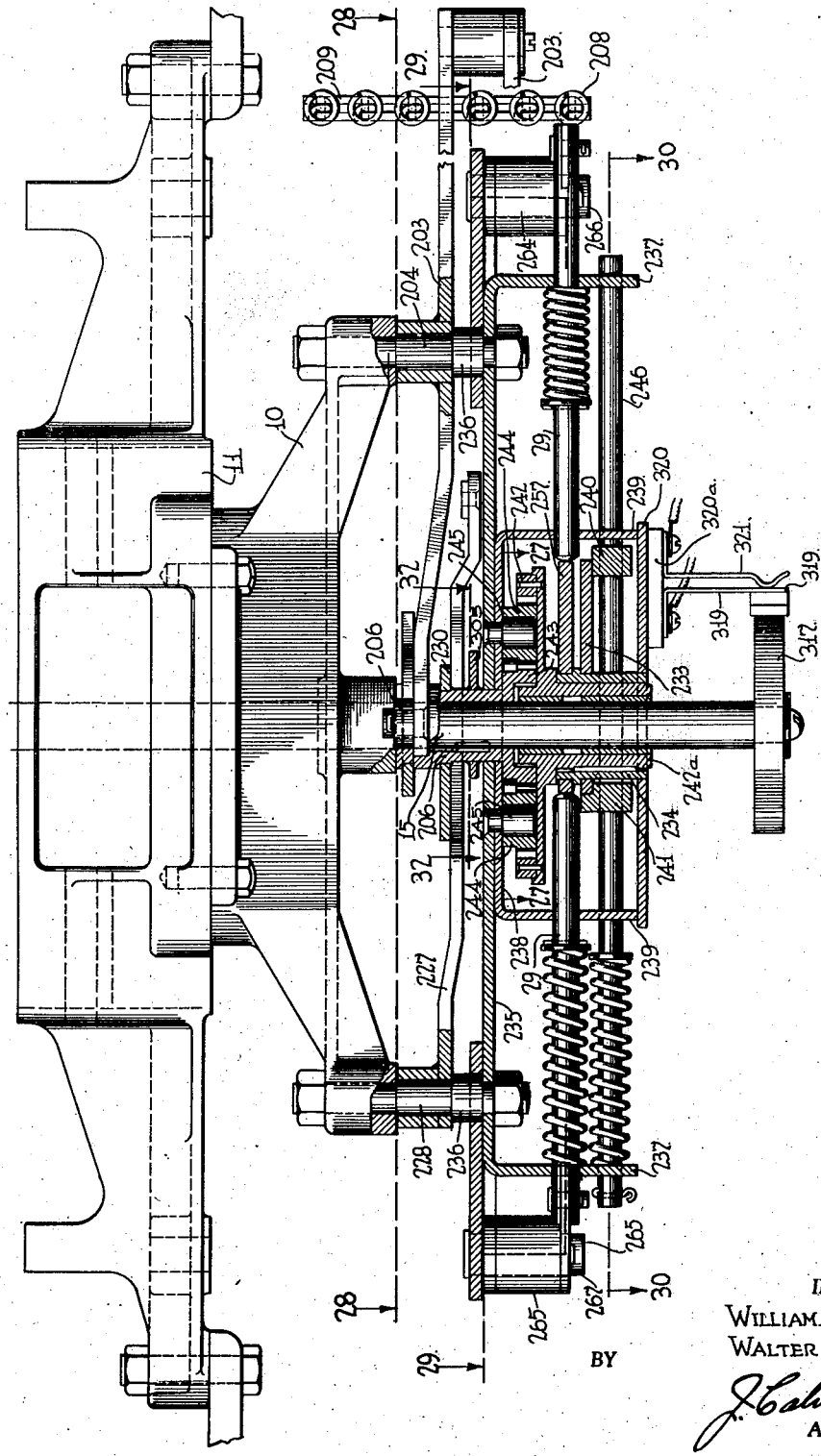

Feb. 24, 1942.    W. A. WEIGHTMAN ET AL    2,274,020
FRUIT JUICE MACHINE
Filed Aug. 10, 1937    22 Sheets-Sheet 16

INVENTORS
WILLIAM A. WEIGHTMAN
WALTER HURLEMAN.
BY
J Calvin Bright
ATTORNEY.

Feb. 24, 1942.  W. A. WEIGHTMAN ET AL  2,274,020
FRUIT JUICE MACHINE
Filed Aug. 10, 1937  22 Sheets-Sheet 18

INVENTORS
WILLIAM A. WEIGHTMAN
WALTER HURLEMAN
BY
ATTORNEY.

Feb. 24, 1942.  W. A. WEIGHTMAN ET AL  2,274,020
FRUIT JUICE MACHINE
Filed Aug. 10, 1937   22 Sheets-Sheet 19
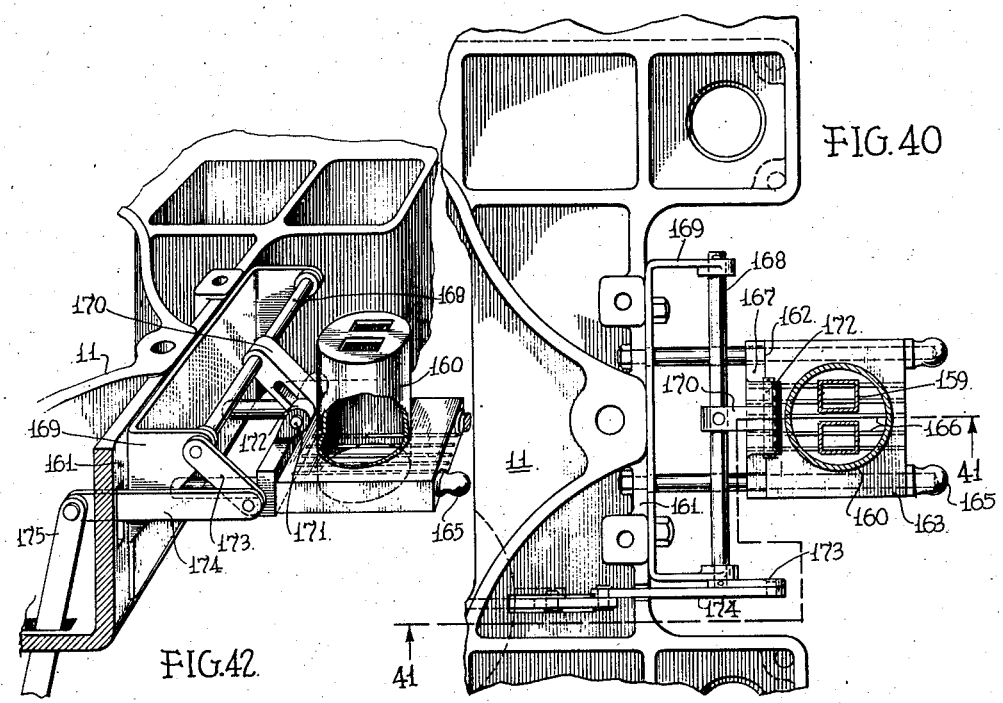
FIG. 40
FIG. 42
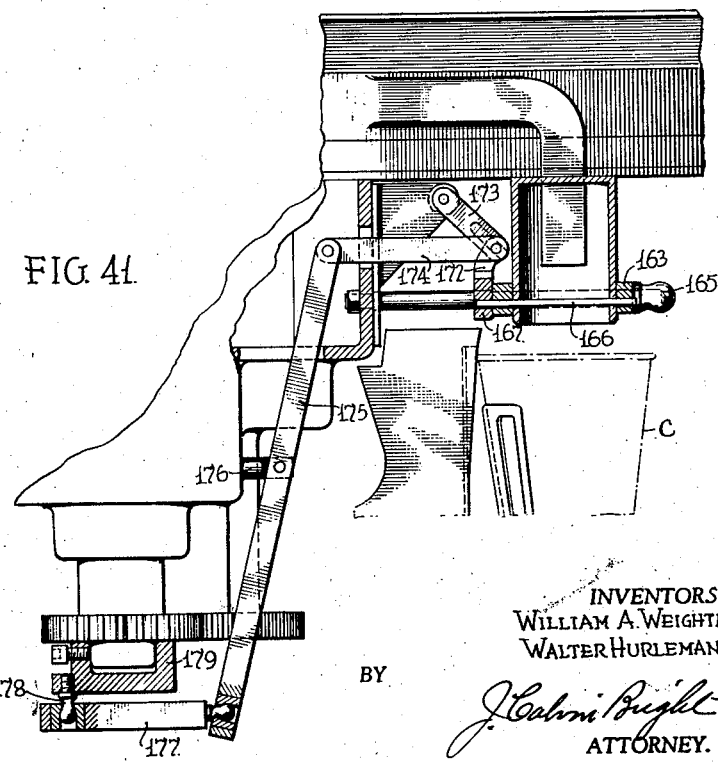
FIG. 41
INVENTORS
WILLIAM A. WEIGHTMAN
WALTER HURLEMAN
BY
ATTORNEY.

Feb. 24, 1942. W. A. WEIGHTMAN ET AL 2,274,020
FRUIT JUICE MACHINE
Filed Aug. 10, 1937 22 Sheets-Sheet 20
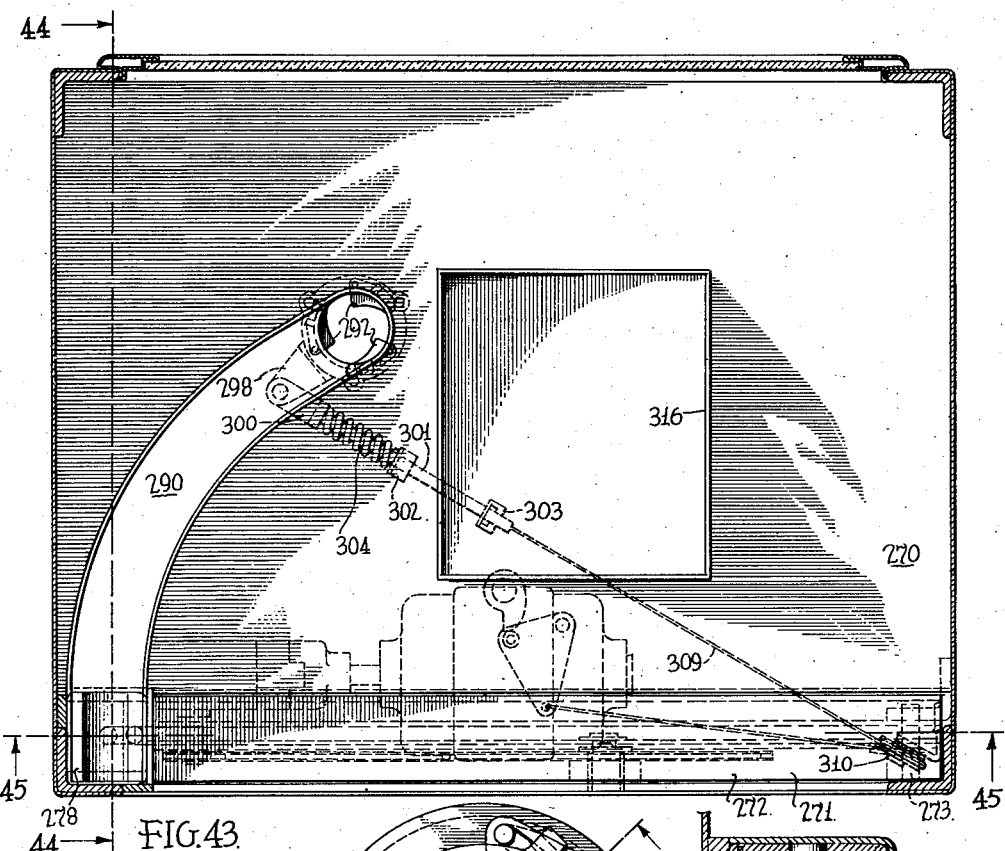
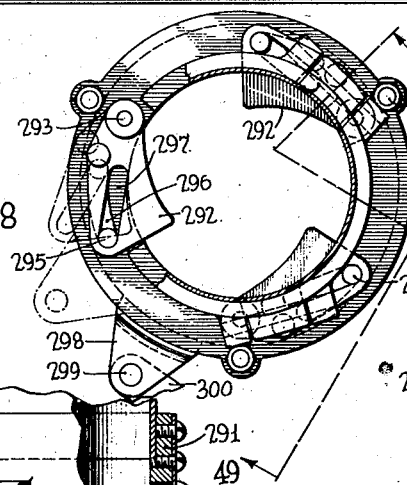
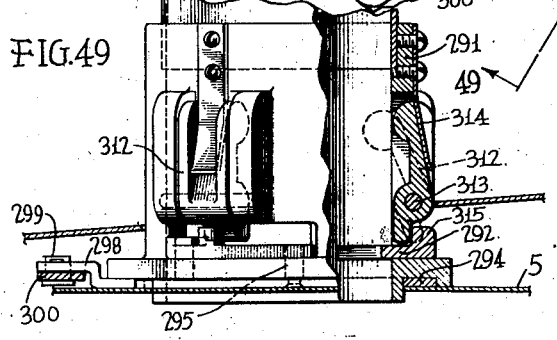
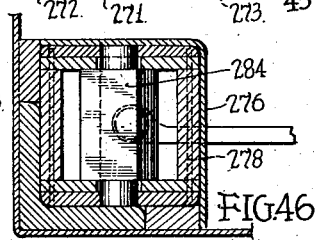
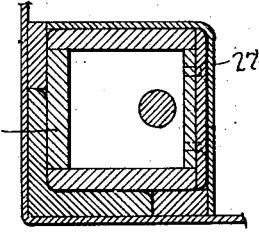
INVENTORS
WILLIAM A. WEIGHTMAN.
WALTER HURLEMAN.
BY J Calvin Bright
ATTORNEY.

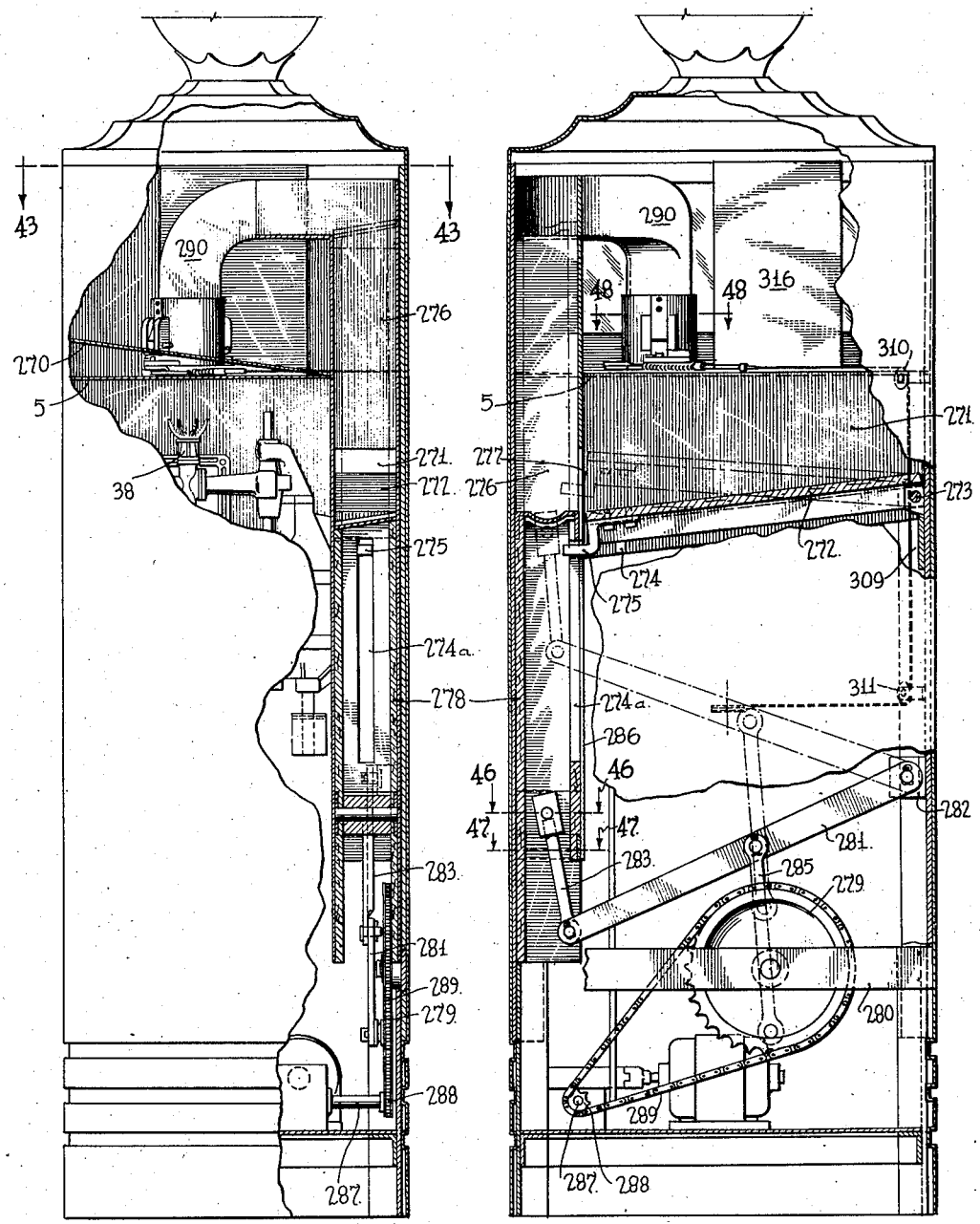

Feb. 24, 1942.    W. A. WEIGHTMAN ET AL    2,274,020
FRUIT JUICE MACHINE
Filed Aug. 10, 1937    22 Sheets-Sheet 22

INVENTORS
WILLIAM A. WEIGHTMAN
WALTER HURLEMAN.

BY  J. Calvin Bright
    ATTORNEY.

Patented Feb. 24, 1942

2,274,020

UNITED STATES PATENT OFFICE 2,274,020

FRUIT JUICE MACHINE

William A. Weightman and Walter Hurleman, Philadelphia, Pa., assignors, by mesne assignments, to Sealdsweet Sales Association, Tampa, Fla., a corporation of Florida Application August 10, 1937, Serial No. 158,380

33 Claims. (Cl. 146—3)

The invention relates to a fruit juice extracting and dispensing machine and more particularly to a machine of this class which is entirely automatic in its operation, and adapted to deliver the freshly extracted juice at the outside of the cabinet, housing the machine, a few moments after its extraction.

It is an object of the invention to produce a machine of this class which is reliable in operation, compact so it can be housed in a cabinet of reasonable size, and be readily transportable from place to place, and located conveniently in railroad stations, office buildings, and other places where people congregate, the machine being constructed to be self-serving after it has been charged with fruit, and connected electrically in the usual manner to a wiring system usually provided, so that it requires a minimum of servicing and attention. All that the cutomer has to do to be served with a drink of freshly extracted juice is to drop a coin in a slot, which sets the machine in operation to deliver a cup of refreshing juice promptly to the customer.

Another object of the invention is the provision of improved mechanisms for carrying out the various operations, such as feeding the fruit, such as an orange, to intermittently rotating hands symetrically arranged on opposite sides of the machine, cutting the fruit in half, extracting the juice, collecting it in a cup, previously fed to a filling position, and after it is filled delivering it at the outside of the machine to the customer.

These and other objects and advantages, as will become clear as the description proceeds, are attained by the machine and mechanism described in detail in the following specification when read in connection with the accompanying drawings forming a part thereof.

In the drawings:

Figure 2 is a rear elevation with the back panel of the cabinet, for the most part, broken away.

Figure 3 is a side elevation as seen from the right of Figure 2, with the adjacent side panel removed, parts being shown in section.

Figure 4 is a front elevation with parts shown in section, of the main unit of the machine, showing the fruit gripping hands, in full and dotted lines, in the various positions which they occupy in the operation of the machine.

Figure 5 is a central vertical sectional view taken approximately on the line 5—5 of Figure 4, through the main unit and the operating mechanism associated therewith.

Figure 6 is a perspective view of the main unit and the operating mechanism carried thereby, with parts broken away to show said mechanism.

Figure 8 is an enlarged sectional view through the hand supporting and operating mechanism, parts being shown in elevation.

Figure 9 is a fragmentary view of the lower portion of Figure 8 and taken at right angles thereto, parts being shown in section taken approximately on the line 9—9 of Figure 8.

Figure 12 is a sectional plan view taken substantially on the line 12—12 of Figure 5 showing the knife and its actuating mechanism, the movable parts being shown in full plan.

Figure 13 is a fragmentary detail view in plan of the knife actuating cam and associated parts.

Figure 14 is a fragmentary vertical transverse sectional view taken substantially on the line 14—14 of Figure 12 and showing, on an enlarged scale, principal parts of the mechanism controlling the movements of the hands and knife.

Figure 17 is a horizontal sectional view through the drive to the main cam shaft and the reamers, taken substantially on the line 17—17 of Figure 5.

Figure 18 is an enlarged detail sectional view through the over-running clutch in the drive to the reamers, taken substantially on the line 18—18 of Figure 17.

Figure 19 is a sectional plan showing the intermittent driving gear for rotating the hands, the section being taken approximately on the line 19—19 of Figure 5.

Figure 22 is a view similar to Figure 21 showing a modified form of hand in its relation to the reamer, prior to the relative approach movement of hand and reamer.

Figure 23 is a fragmentary elevational view of the hand shown in Figure 22, parts being shown in section.

Figure 24 is a detail horizontal sectional view through one of the fruit gripping inserts shown in vertical section in Figure 23.

Figure 25 is a transverse horizontal sectional plan view through the machine cabinet taken approximately on the line 25—25 of Figure 3 showing the cup push-out and transfer and the gate operating mechanisms.

Figure 26 is an enlarged vertical transverse sectional view taken approximately on the line 26—26 of Figure 25, parts being shown in elevation.

Figure 27 is a detail sectional plan view of the planetary gear transmission from the main cam shaft to a sleeve shaft concentric therewith, the section being taken substantially along the line 27—27 of Figure 26.

Figure 38 is a rear elevation of the gate parts as seen looking in the direction of the arrows shown at the end of the line 38—38 of Figure 33.

Figure 39 is a horizontal sectional plan view through the gate, the section being taken along the line 39—39 of Figure 35.

Figure 40 is a plan view of the detail, parts being in section, taken along the line 40—40 of Figure 33 showing the strainer and its immediately associated operating mechanism.

Figure 41 is a vertical sectional view through the strainer and its operating mechanism, parts associated therewith being shown in elevation, the section being taken approximately on the line indicated at 41—41 of Figure 40.

Figure 42 is a perspective view of most of the parts shown in Figures 40 and 41, parts being broken away.

Figure 43 is a horizontal sectional plan view through the top in the fruit charging compartment of the machine, the section being taken approximately on the line 43—43 of Figure 44, showing the fruit feed and release mechanism.

Figure 44 is a partial vertical sectional view taken substantially along the line 44—44 of Figure 43.

Figure 45 is a similar view taken substantially along the line 45—45 of Figure 43.

Figures 46 and 47 are enlarged detail views through the elevator shaft and elevator taken, respectively, along the lines 46—46 and 47—47 of Figure 45.

Figure 48 is an enlarged horizontal sectional view, the section being the gravity feed chute taken about on the line 48—48 of Figure 45 just above the fruit release mechanism.

Figure 49 is a partial vertical sectional view through the lower end of the gravity feed chute, the section being taken about on the line 49—49 of Figure 48.

Figure 50:
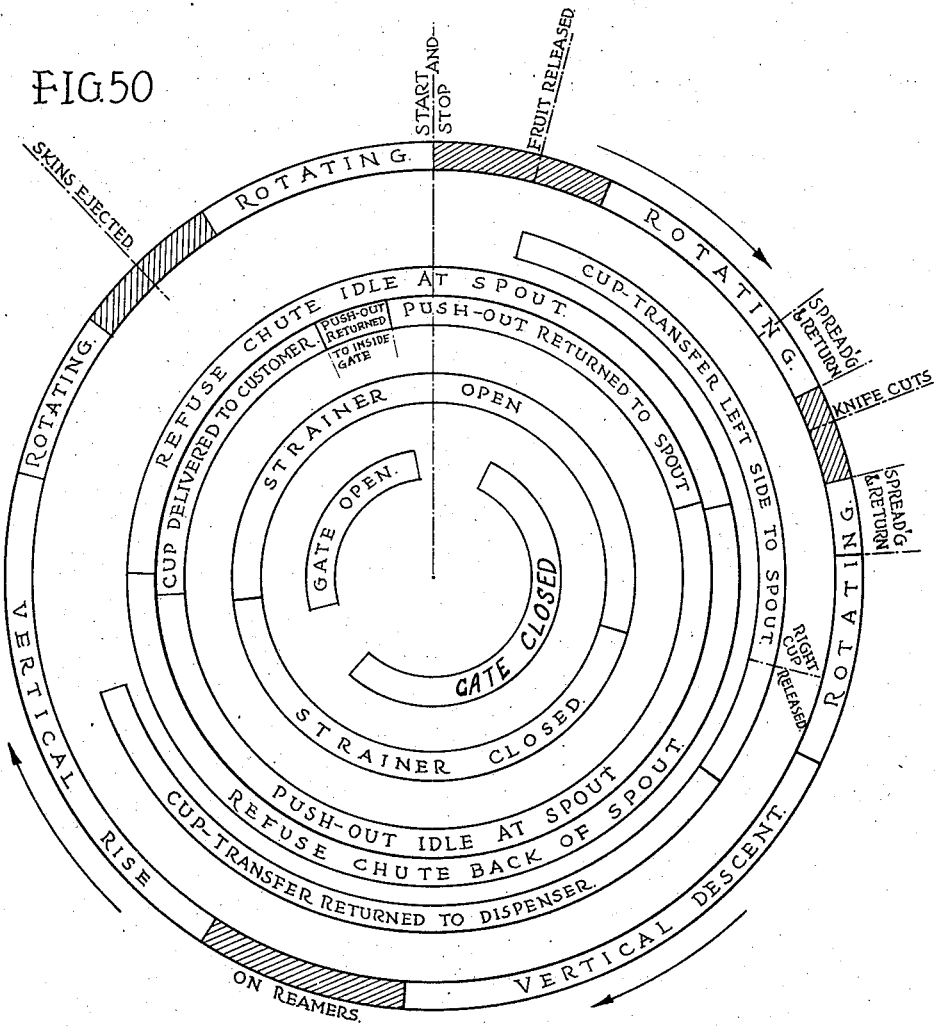

Figure 50 is a timing chart showing diagrammatically the movements of the hands, the cup transfer, the cup push-out and refuse chute, the strainer rods and the gate and their relations during one operative cycle of the machine, the starting and stopping indicated by a vertical line from the center to the top of the chart.

Figure 51:
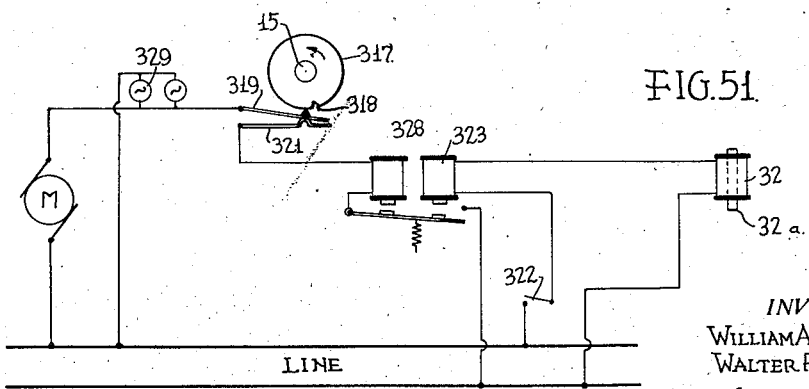

Figure 51 is a diagrammatic representation of a wiring system which may be employed.

GENERAL DESCRIPTION

Figure 1:
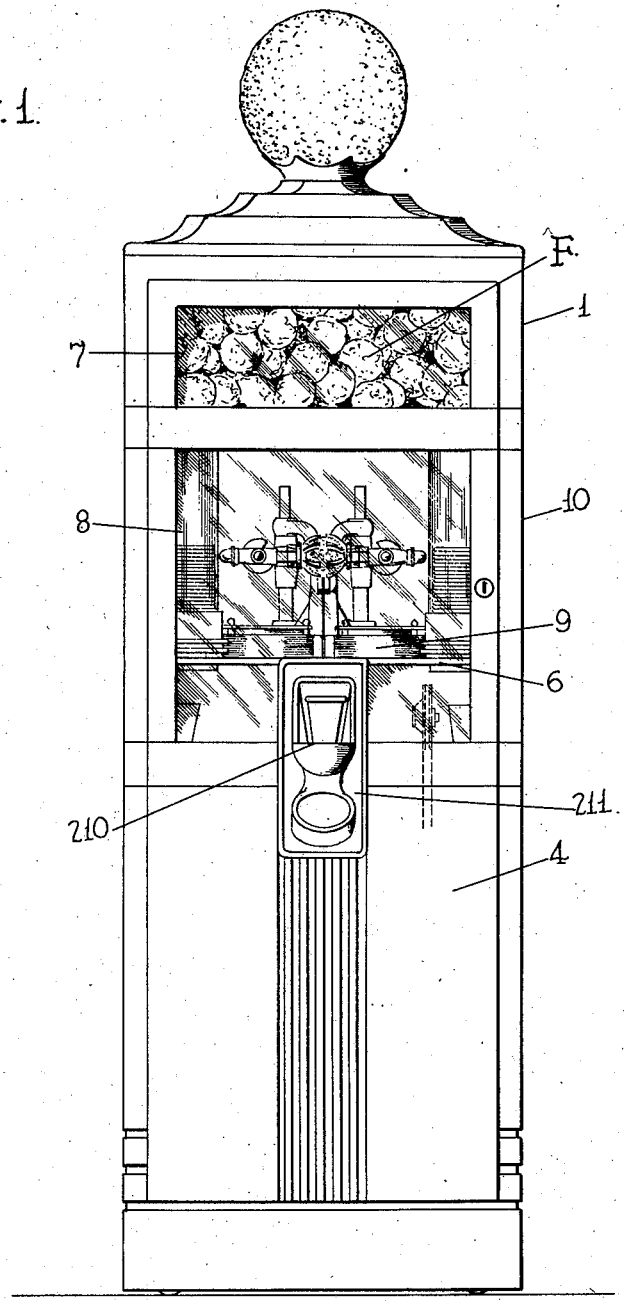
Figure 1 is a front elevation of the cabinet with the machine housed therein.

In general, referring to Figures 1 to 3, the machine is preferably housed in a sheet metal rectangular cabinet 1, built of angle iron framing including vertical corner members 2 and transverse members 3 interconnecting the corner members at top and bottom and intermediate points, as desired, and to secure the necessary strength and rigidity, the frame members being preferably secured together by welding. The framing 2 and 3 is covered by sheet metal paneling 4, covering the sides, top and bottom to form a box-like casing, the interior of which is accessible for servicing, etc. through doors or removable panels suitably provided but normally kept locked or otherwise secured, so as to prevent access to the interior of the cabinet by unauthorized persons. The permanently fixed portions of the paneling are also preferably rigidly secured, as by welding, to the framing to reinforce and strengthen the structure.

The bottom paneling 4 is preferably supported on the transverse frame members 3 arranged slightly above the bottom of the side walls of the cabinet.

The interior of the cabinet is preferably divided by transverse plate partitions 5 and 6, the partition 5 being adjacent the top and forming with the sides and top a charging chamber or hopper to receive a supply of the fruit F to be processed. At the front of the cabinet a glass panel 7 may be provided to render the fruit in this chamber visible from the outside. Such a panel as 8, is also provided below the partition to expose to view parts of the main unit of the machine.

The partition plate 6 forms the bottom of a chamber housing the upper portion of the main unit 9 of the machine, this main unit comprising a main framing or housing constructed for convenience of manufacture and assembly of a superposed series of castings 10, 11, 12, and 13, bolted together in the assembly of the machine. The main casting 11 extends from side to side of the cabinet, see Figure 2, and rests on top of the transverse intermediate members 3 of the cabinet framing and is secured thereto, as by bolts. The main casting 11 is located just below the partition plate 6, which is intervened between the top of this casting and the casting 12 above it and is secured in place therebetween by the bolts securing the castings together.

The chamber below the partition 6 is, by reference to Figures 2 and 3, seen to house in its upper portion a large part of the main unit 9 of the machine, and in its lower part, the motor 14 for driving the machine, and a large refuse receptacle adapted to receive the skins, seeds, etc., which are guided to it from the machine above, as will be pointed out hereinafter.

The main unit 9 of the machine, as hereinbefore described, carries most of the operating mechanisms of the machine, including (A) the hands and their operating mechanism for receiving the fruit from the supply chamber or hopper, then transporting it to the knife, then to the reamers, then carrying the skins to the discharging position, and finally returning to the receiving position; (B) the knife and its operating mechanism; (C) the reamers and the juice collecting mechanism; (D) the skin ejector mechanism; (E) the cup dispensers; (F) the empty cup transfer; (G) the filled cup delivery mechanism; and (H) the refuse (seeds and pulp) separation and disposal mechanism.

These mechanisms are all operated by the motor 14 and their movements are controlled and timed by a vertical cam shaft 15, the motor being set in operation by a relay in turn controlled by a coin controlled device (not shown) operated by dropping a suitable coin in a slot, see Figure 1, provided on the front of the cabinet. With the start of the motor, the various operations are carried out during one complete rotation of the cam shaft 15, when the machine will be automatically stopped, to be started only by the insertion of another coin in the slot when the cycle will be repeated. During each cycle the juice will be freshly extracted from one fruit and delivered outside the cabinet to the customer.

*The drive from the motor to the cam shaft*

Referring now to Figures 2, 4, 5, and 17 the motor 14 drives through its armature shaft connected pulley and the crossed belt 16 to the pulley 17. This pulley is splined to a pinion 18 which is mounted to rotate freely on anti-friction bearings on a transverse shaft 19, itself mounted in the forward downwardly projecting portions 20a of a gear casing 20 formed by the hollow central portion of the frame castings 10 and 11, and closed at the top by the casting 12.

The lower portion of this gear casing is normally filled with oil to afford continuous lubrication for the movable parts mounted therein. The pinion 18 drives a gear 21 splined to a worm shaft 22 carrying a worm 23 and mounted, with an anti-friction thrust bearing, in the gear casing 20. The worm 23 in turn drives a worm gear 24 mounted in the lower portion of the gear casing to rotate freely on the cam shaft 15, extending vertically through the gear casing 20.

To prevent over drive of the cam shaft 15, even if the motor should continue to run after the cam shaft has made a complete revolution, the worm gear 24 is connected to the shaft by a trip mechanism, arranged to make and break the drive between it and the cam shaft 15. This trip mechanism, as shown in Figures 5, 17, and 19 comprises an internal ratchet 25 on the gear 24 and a pawl 26 cooperating with said ratchet 25 and mounted for rotation from operative to inoperative position on stub shaft 27 mounting it on the intermittent gear 28 splined to cam shaft 15 immediately above the worm gear 24. A flat substantially triangular plate 29 is rigidly secured to stub shaft 27 and a spring 30 urges the pawl to the operative and driving position. A vertically movable stop pin 32a normally projects into the path of a lateral extension 31 of plate 29, and this pin swings the pawl 26, out of operative engagement when the cam shaft 15 has completed one revolution. The pin 32a holds the pawl in inoperative position through engagement with extension 31 until the machine is again started for a new cycle of operation. Any suitable means for lifting the pin 32a to release the pawl to the action of its spring 30 at the start of the machine, may be provided, such as the solenoid, indicated at 32, this solenoid being energized but temporarily to raise the pin out of engagement with the plate extension 31 and this extension will immediately move under it, under the action of the spring 30, and hold it raised until the extension 31 moves out from under it and releases the pin, permitting it to again drop down into the path of the extension 31 in position to disengage the pawl 26 and break the drive to the cam shaft after one revolution thereof.

*The drive to the reamers*

The reamers 33 are arranged in pairs adjacent the front of the machine, see Figures 4, 5, 20, 21, and 22, being carried at the top of vertical shafts 34 mounted through anti-friction bearings in the gear casing 20 which shafts are driven directly from the transverse shaft 19 through the spiral gears 35 thereon meshing with pinions 36 on the vertical reamer shafts 34. The reamers are thus driven at high speed with relatively little reduction from the motor speed. The movable parts of the juice collecting housings designated generally by the reference numeral 37, are also rotated at the speed of the reamers, being splined to the reamer shafts just above their upper bearings, see Figures 21 and 22. To permit over-running of the rapidly spinning reamers and connected parts, an over-running clutch shown in detail in Figure 18 is provided between the pinion sleeve shaft 18a and the flanged collar 19a splined to the end of shaft 19.

*The intermittent hand-rotating mechanism*

The hands, designated generally by the numeral 38, are arranged for intermittent rotary motion directly above and in the plane over the reamers, see Figures 4, 5, 7, 8, and 9, the reamers and hands being mounted symmetrically on opposite sides of the vertical central plane of the machine, as shown also in Figures 1 and 2. In fact, most of the mechanism and frame of the main unit of the machine is arranged symmetrically on opposite sides of this plane. As shown in Figure 4, by the arrows on the circular dot and dash lines, the hands are rotated reversely, the one on the right, counter clockwise, and the one on the left, clockwise. When the machine is at rest, they are in the vertical position I shown in dotted lines, and the right hand one is in position to receive and grasp a fruit F, fed one at a time from the feeding mechanism. From this position they are rotated to the horizontal position II where both hands are shown grasping a fruit. Here they dwell until a knife has severed the fruit in two, after which the hands, each now grasping its part of the fruit, are rotated to the vertical position III shown in full lines, directly over the reamers, where there is another and long dwell while the juice is being extracted in the relative approach of the hands and reamers, as indicated in dotted lines. After the upward return of the hands to the full line position, they are again rotated to the lateral position IV shown in dotted lines, where the skin is ejected, after which the empty hands are rotated to the starting position ready to receive another fruit for the next cycle of the machine.

To impart to the hands 38 the intermittent rotary movement described hereinbefore, the intermittent gear 28, see Figure 19, on the cam shaft 15 has four sets of teeth spaced by smooth lands conforming generally to the pitch circle, the four smooth lands corresponding to the dwell positions indicated in Figures 4, and 19 by reference characters I, II, III, and IV. An intermittent pinion 39 meshes with the gear 28, having corresponding sets of teeth and between the sets of teeth, short lands concentric with the corresponding lands on the intermittent gear and adapted to slide thereon holding the pinion stationary, while the gear is rotating to bring the next set of teeth into engagement. As shown in Figure 17, the pinion and gear are substantially in the position they occupy at the start of the machine.

The intermittent pinion 39 is splined to a short vertical shaft 40 mounted in the lower forward part of the gear casing 20 just forwardly of the transverse shaft 22, see Figure 5. The shaft 40 carries at its lower end, projecting from the casing, a gear 41 meshing with a pinion 42 carried by the lower end of a vertical shaft 43 extending up through the gear casing and arranged to actuate the right hand 38. Through an idler gear 44 and the pinion 45 on the left hand actuating shaft 43, the gear 40 drives said shaft in reverse direction to that of the right hand shaft but at the same speed.

Since the operation of the right and left hands is the same except that they are rotated in reverse directions, the operation of the right hand only will be described in detail.

As is clearly shown in Figures 5 and 9, the shaft 43 has secured to it just above its lower end bearing, a collar 46 which bears on the bottom of the gear casing. Above this collar the shaft is square in cross section, and has a slidable but non-rotatable connection at the top with a spiral gear 47, see Figures 7 and 8, which is mounted to rotate in a housing 48 secured as by a pin 48a to the top of a vertically slidable sleeve 49 extending above the main gear casing 20, the housing resting on a shoulder of said sleeve. The hollow hand carrying arm 50 is integral with and projects laterally from the housing, see Figures 7 and 8, and carries a shaft 51 having a spiral pinion 52 meshing with the gear 47. The pinion 52 is secured to the inner end of the shaft, while the outer end of the shaft carries a hollow stem 53 of the hand and ejection mechanism, this stem being splined to the shaft and clamped against a shoulder formed by the reduced end of the shaft by a nut, as clearly appears in Figure 8.

Figure 7:
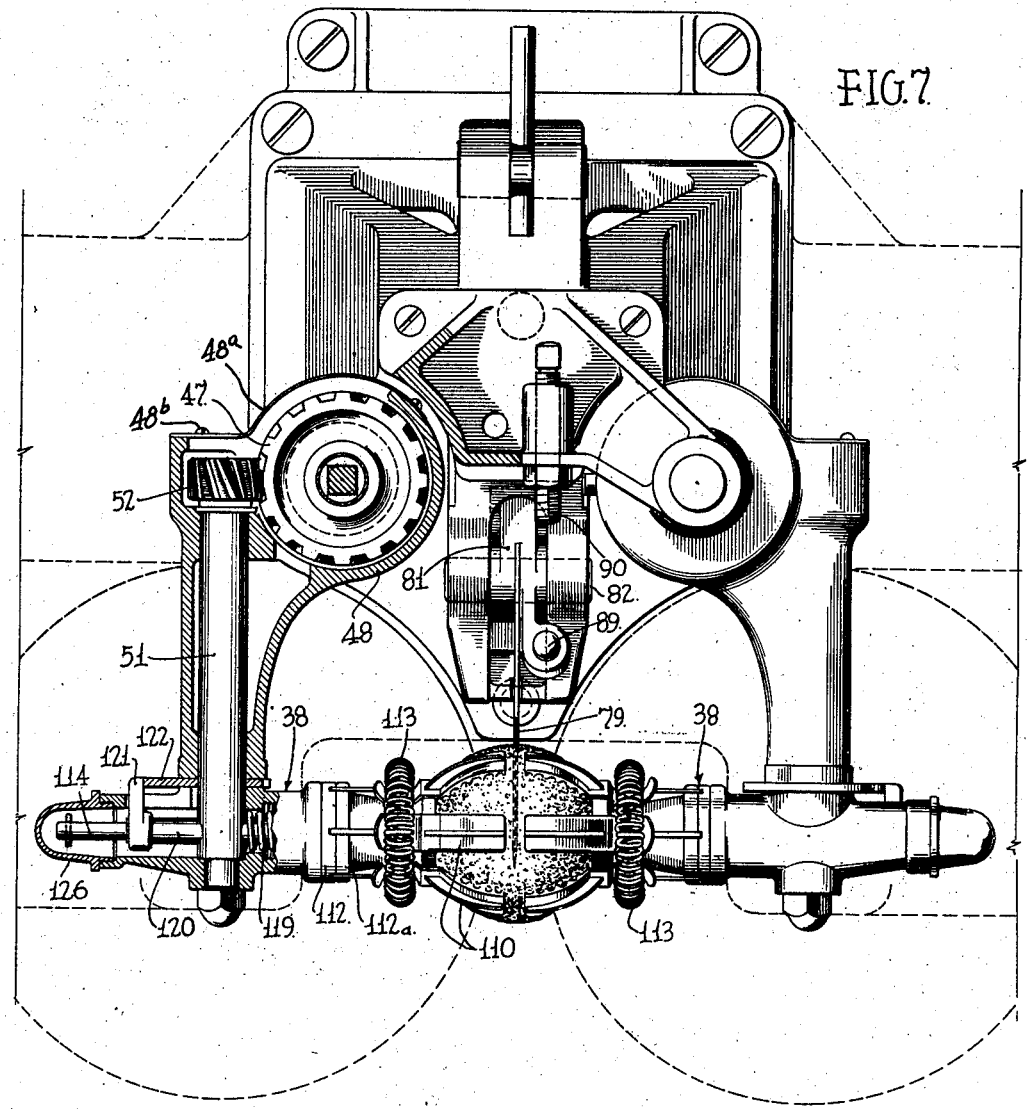
Figure 7 is a plan view of the upper portion of the main unit with parts broken away to show the drive to the fruit gripping hands, these hands being shown in the cutting position.

To provide for the convenient assembly and disassembly of the gears 47, pinion 52 and shaft 51, with and from the housing 48, the rear of this housing is provided with an opening, which may be closed by a thin removable plate 48a, as is clearly shown in Figure 7, secured in place by screws 48b, the plate conforming to the shape of the housing. This housing may also be filled with oil for the continuous lubrication of the movable parts therein.

*The hand reciprocating and spreading mechanism*

In addition to the rotary movement hereinbefore described, the hands 38 having a vertically reciprocating movement for bringing them into and out of operative relation to the reamers 33 when they are in the position III shown in Figure 4. Also, to insure that the fruit is firmly seated in and grasped by both hands when they are in the cutting position II, Figure 4, and to afford the desired clearance between the hands, both in the approach and receding movements of the hands from said position, it is desirable that a spreading movement be imparted to the hands before they reach this position and again before starting the rotary movement to position III. The spreading before is to permit the fruit grasped by the right hand to be readily brought into seating alignment with the left hand, after which, and before the cutting operation, the hands approach so that each firmly grasps the fruit during said operation. The spreading movement after cutting is merely to provide proper clearance in the first part of the ensuing rotary movement. The means whereby these movements are achieved will now be described.

*The vertical movement of the hands*

The vertical movement of the hands is brought about through the sliding movement of the sleeves 49 guided below the arm 50 by a collar 54 mounted in the top wall of the gear casing 20, formed by the casting 12, see Figures 8 and 14, and further guided above the arms 50, see Figures 4 and 5, by a curved bracket 55 on the top casting 13 bolted to the top, see Figure 5, of the hollow upward extension 56 of the casting 12 which forms the top of the gear casing 20. The reduced extension 49a of the sleeve 49, which extension is secured in the top of the gear housing 48 is guided by a bearing in this bracket 55. As shown in Figure 8 the sleeve 49 and its reduced extension 49a form the bearing for the gear 47 of the hand rotating mechanism hereinbefore described.

On the opposite sides of the sleeve 49 are formed elongated slots 57 into which project pins 58, see Figures 8, 9, 11, and 14. These pins are carried by the forks 59 of a furcated arm 60. The arms 60, Figure 11, for the opposite hands are rigidly joined together rearwardly on the cam shaft 15 so as to move in unison, being mounted for such movement on the pivot pin 61 at the rear of the hollow upward extension 56 of the casting 12. Vertical movement is imparted to the arms 60 through a barrel cam 62 mounted to rotate with the cam shaft 15, through its connection with an upwardly extending flange on the intermittent gear 28 splined to said shaft, the barrel cam having a cam groove 63 therein, and within this groove a cam follower pin 64 projects from one of the arms 60, in this case the left arm. By reference to Figures 5 and 14 it will be seen that the groove 63 in the barrel cam extends horizontally near the top of the barrel approximately half a revolution thereon and then dips downwardly rather abruptly to cause a rapid approach of the hands and reamers, after this abrupt dip, it curves off gradually into a portion extending almost horizontally. During this time the fruit is gradually fed into the reamers for the extraction of the juice, the feed being slowed up toward the downward limit of movement of the hands so that in the final downward movement, the hands may be said to dwell on the reamers. The cam groove then abruptly rises to bring the hands quickly back to the elevated position corresponding to the horizontal part of the groove.

The downward movement of the sleeve 49 under the influence of the cam is cushioned by a spring 65 bearing at one end against the bottom of the sleeve 49, through an annular bushing 66 and, at its opposite end, against the pins 58, through an annulus 67. This cushioning is to prevent a too rapid feed of the hand toward the reamer and also to take care of fruit having variable thickness of skin.

Spreading movement of the hands

It will be noted that the slots 57 are of a width considerably greater than the diameter of the pins 58 engaging therein and this is to permit a slight rotary movement of the sleeves without interference by the pins 58. This rotary movement is desirable to spread and approach the hands just before and again spread and approach after the cutting of the fruit and is brought about as by the mechanism now to be described.

Figure 10:
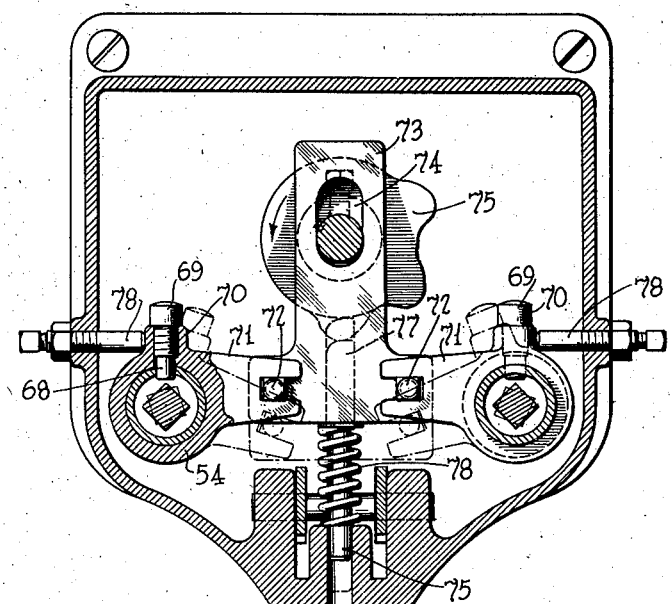
Figure 10 is a horizontal section taken substantially on the line 10—10 of Figure 5, showing the hand spreading mechanism.
Figure 11:
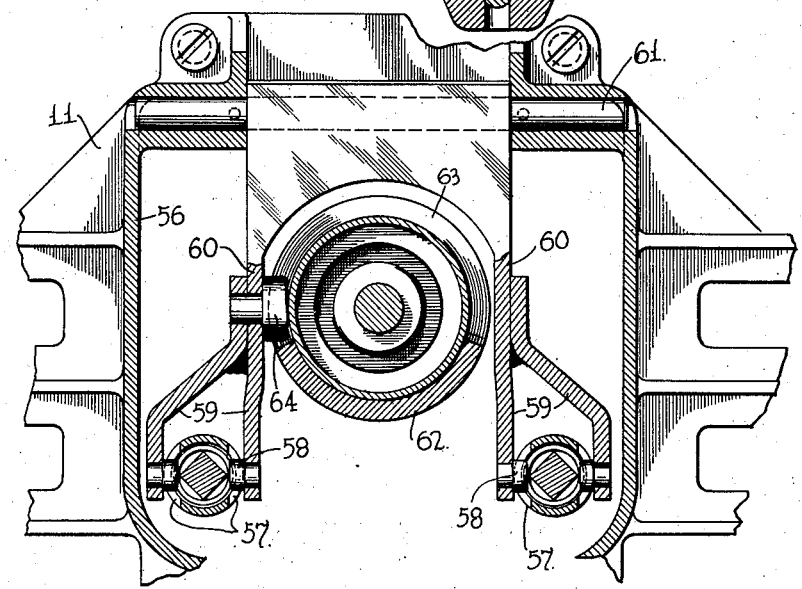
Figure 11 is a section taken approximately on the line 11—11 of Figure 5 showing the mechanism controlling the vertical movements of the hands.

Referring to Figures 8, 9, and 10, each of the sleeves 49, has an elongated slot 68 into which projects a pin 69 screwed into a boss 70 on a collar 54, which is longitudinally held in place by a plate 54a (shown in the dotted lines in Figure 12) secured to the casting 11 and projecting into a groove in the collar 54, as clearly appears in Figures 8, 9, and 14. Each collar 54 in Figure 10, has an inwardly extending arm 71, forked at its free end, the forked end embracing a pin 72 projecting from the upper face of a slidable plate 73. This plate is guided at one end by a slot 74 embracing the cam shaft, and between the flat top face of a cam 75 and a boss on the casing, see Figure 5. A pin 76 is secured to the opposite end of the plate guides it, through its extension into a hole drilled in the front of the casting 12, and a cam follower 77 secured to the bottom of the plate is pressed against the face of the cam 75 by a spring 78 surrounding the pin 76. The dotted lines of Figure 10 show the position of the parts when the hands are spread apart, while the full line position shows the parts with the hands in their closest approach toward each other, this approach movement being limited by the engagement of the adjustable stop pins 78 with the bosses 70. It will be noted that the cam has two high points whereby to effect the two spreading movements of the hands hereinbefore mentioned. The cam and the adjustable stops permit the spreading and approach movement to be adjusted to a nicety to accommodate fruit of varying sizes.

The cutting mechanism

When the fruit is held firmly gripped by the hands in their closest approach position II, see Figure 4, the knife blade 79, see also Figures 5, 6, 7, and 12, of suitable tempered steel and having a cutting edge 80 sweeping away from a pointed portion thereof in opposite directions, so that the cutting edges at opposite sides of the point make with each other an angle of less than 90 degrees, is actuated to strike the fruit forcibly with its point entering first, the edges dropping away from the point and then coming into play and effecting a clean slicing of the fruit into two parts.

The knife blade is rigidly secured, as by screws, into a forwardly opening slot provided in the mounting casting 81 and rests firmly, when secured, against the rear wall of the slot, as indicated in Figure 5. The mounting casting is pivoted on a pin 82 between ears provided at the top forward portion of the hollow vertical extension 56 of the casting 12 and the knife blade projects through a narrow slot provided in this extension.

A powerful coil spring 83 operates the knife, the spring being guided by a guide rod 84 secured at one end to a clevis which in turn is hinged to the knife mounting casting by a pin 85 arranged a substantial distance rearwardly and below its pivot pin 82. The other end of the guide rod 84 passes through a hole in swivel pin 86 mounted in the spaced rearwardly extending ears 87 on the casting 12. The spring 83 bears at one end against the guide rod clevis and at its opposite end against the ears 87 through the annulus 88.

On the side opposite the spring connection, the mounting casting 81 is provided with a suitable form of yielding buffer, as 89, which cushions the blow at the end of the upward swing of the knife. An adjustable stop pin 90 limits the swing of the knife by its coaction with the buffer 89.

To cock the knife spring, a double strap link 91 has its upper end extending into a slot in the mounting casting 81 and hinged on the pin 85, its lower end, see Figure 14, straddling the pin 76 and the spring surrounding it and being pivoted on the pin 92 through a slotted connection, see Figure 5. Between its ends it is pivoted to a sliding plate 93 through the pin 94 passing through a slot in the link 91. This plate like the plate 73 has a slot through which the cam shaft 15 passes, and is guided by the flat top face of the knife-cocking cam 95 and a collar 96 pinned to the upper end of the shaft 15. At its rear end the plate 93 is formed with a downwardly projecting flange to which a cam follower 97 engaging the cam 95 is adjustably secured, see Figure 5.

As shown in Figures 5 and 13, the plate 93 has the edges of the slot therein formed with shallow upturned flanges. This construction minimizes the friction between the plate and its upper and lower guiding surfaces.

It will also readily appear from Figure 13 that the cam 95 is formed with a sudden drop off, so that the knife will be suddenly released to the action of the powerful spring 83. By reference to Figure 5, where the spring is shown in the cocked position, it will be evident that, by reason of the relative location of the pivots 82, 85 and 86, that the power delivered to the knife by the spring will gradually increase until the knife has cut well into the fruit. Thereafter, although the power of the spring will no longer increase and may even diminish slightly, it is still amply sufficient aided by the momentum of the parts to force the knife clean through the fruit.

Figure 15:
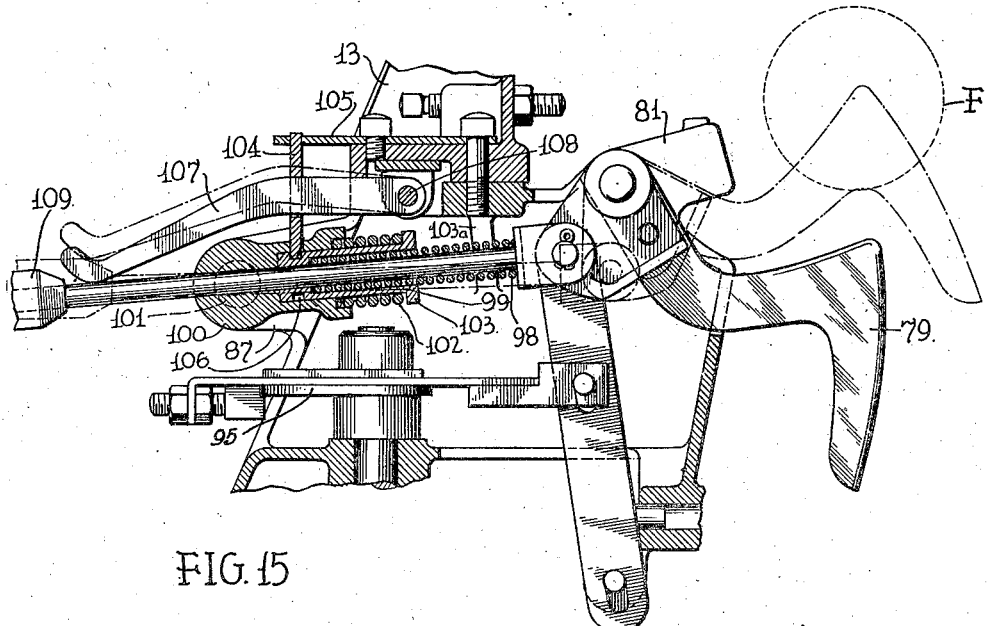
Figures 15 and 16 are fragmentary central vertical sectional views taken through the upper portion of the main unit showing an alternative form of the knife actuating mechanism, parts being shown in Figure 15 in full line with the knife cocked and in dotted lines after release, and these parts being shown in Figure 16 at the end of the cutting operation.
Figure 16:
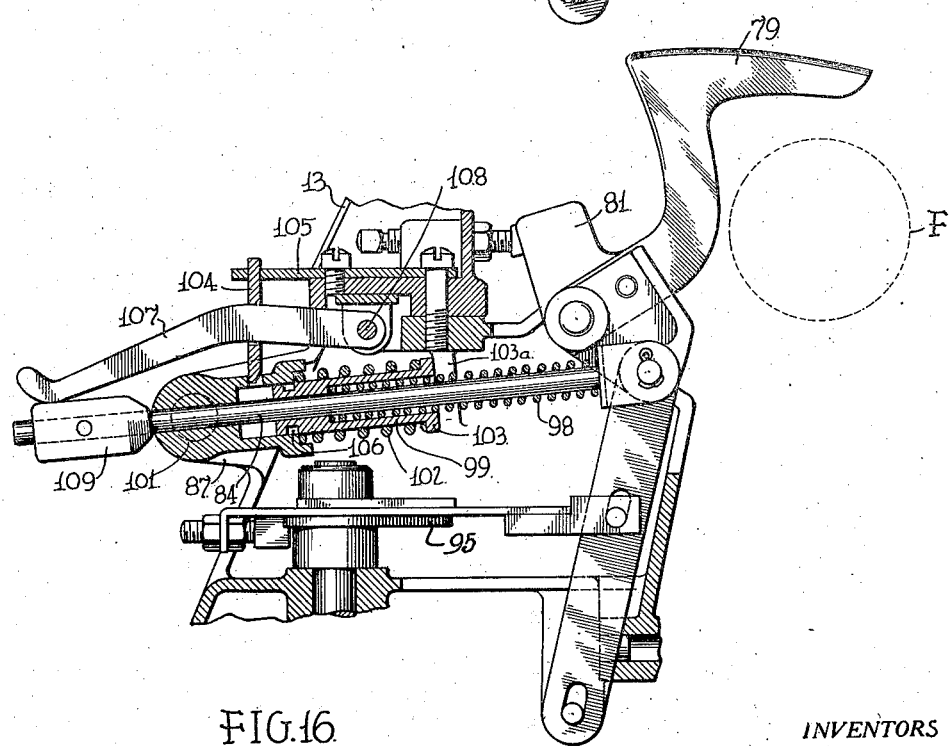

If the fruit has an unusually hard or tough skin, or is of a kind having a tough core filled with a large number of seeds, or both, the knife actuating mechanism shown in Figures 15 and 16 is preferably employed. According to this embodiment, the knife actuating spring is arranged so as to augment the force of the spring after the knife has penetrated well into the fruit as indicated by the dotted line in Figure 15, this augmented force making more positive the driving of the knife through the fruit to complete the severing operation. The means by which this effect is produced will now be described. Instead of employing one spring for actuating the knife, two springs are employed, one spring 98 bearing at one end against the clevis through which the guide rod is secured to the mounting casting 81. The spring is coiled around the guide rod and rests with its opposite end against the bottom of the sleeve 99 slidably mounted on the guide rod and projecting at one end thereof into a recess formed in an abutment block 100 trunnioned through the trunnion pins 101 between the ears 87 hereinbefore described. A heavy coil spring 102 surrounds the sleeve 99 and bears at one end against the flange 103, on the outer end of the sleeve 99 and at its opposite end on an abutment block 100. Both springs are cocked in the manner described in the preceding form of knife operating mechanism.

In Figure 15 they are both shown in the cocked position, the spring 102 being locked in this position by a vertically sliding locking bar 104, guided at its upper end in a plate 105 bolted to the top frame casting 13. The lower end of the locking bar is guided through an opening in the top of the abutment block and has its nose engaged within an annular groove 106 provided in the sleeve 99 to hold the spring cocked until it comes time to release it for its action. Such release is effected by a release lever 107 pivoted at 108 and extending through a hole in the locking bar with its outer end resting on the extension of the guide rod corresponding to the guide rod 84 in the previously described modification. In this case, however, the guide rod is provided at its outer end with a head rigidly secured to it 109 and having a cam face thereon.

The operation of this mechanism is as follows; when the cam 95 releases the springs, the knife is first actuated by the spring 98 alone, until the parts occupy the position shown in the dotted lines in Figure 15 with the point of the knife driven about half way through the fruit F, also represented by dotted line outlines. At this time the head 109 will have cammed the lower end of the lever 107 upwardly sufficiently to move the locking bar 104 to release position, whereupon the second and heavier spring 102 comes into play, and the knife is driven forward with augmented impetus under the force imparted to it by both springs to completely sever the fruit. A stop 103a engages flange 103 to stop the over expansion of spring 102.

*The fruit gripping and ejecting mechanism*

The mechanism for gripping and ejecting the fruit may vary with the particular fruit being treated. In the form of the invention shown in Figures 4, 5, 7, and 8, the hands comprise a plurality of curved fingers 110 serrated on their inner margins to firmly grip the skin of the fruit, these fingers being pivoted at their inner ends on the annular pin 111, see Figure 8, forming a common pivot for all of the fingers, this pin being securely clamped in opposed grooves (not shown) formed, respectively in ring 112 and finger carrying extension 112a having its reduced inner end screwed into the end of the hollow stem 53. The inner ends of the fingers operate in radial slots formed in the extension 112a and the ring 112. The fingers 110 are forced together to grip the fruit by an annular coil spring 113 surrounding the fingers and located by curved seats therein.

The ejector mechanism operates in the hollow stem 53 and extension 112a and comprises the longitudinally extending plunger 114 having at its outer end a flat disc-shaped ejector head 115, which is normally seated in a recess 116 formed by the inner margins of the fingers inwardly of the curved gripping portions thereof. The ejecting plunger is of reduced diameter inwardly of its head, this reduced portion passing through an opening between the fingers and being enlarged into a conical portion 117 adapted to engage cam faces 118 on the fingers to force the same apart during the ejecting operation.

The ejection takes place under the action of a spring 119 surrounding a sleeve 120 coaxial with the plunger 114 and bearing at one end against the flanged end of the sleeve and at the other end against the shaft 51 through an opening in which the plunger and sleeve freely pass. The spring is cocked during the rotation of the hands by having a laterally extending cam follower 121 carried thereby and projecting through a slot in the stem 53, ride on the cam 122 fixed to the arm 50, as shown in Figure 8, by screws passing through a collar on the outer end of the arm. The flat face of said cam 122 serves as a thrust bearing for the hand during the rotation thereof. This cam 122 has a sudden drop off, which releases the cocked spring 119 to cause the ejection of the skin of the fruit when the arm has reached the position IV shown in Figure 4.

During the ejection the cylindrical part 123 at the base of the conical portion 117 of the plunger 114 takes an advanced position between the fingers and is frictionally held in such position to maintain the fingers spread apart against the action of the spring 113. Such advanced position is indicated in Figure 8 by dotted lines. The parts will remain in this position under the action of the spring 113 until a fruit is dropped or forced into the hands. At such time the spring 119 will already have been compressed sufficiently under the action of the cam 122 to impose no restriction other than its frictional engagement with the fingers under the action of spring 113, on the inward movement of the plunger, the weight of the fruit and its momentum when it drops into the hand being sufficient to overcome this friction. The outward movement of the plunger is limited by a cotter pin 124 at the inner end of the plunger and in position to engage a stop plate 125 clamped between a shoulder on the hollow stem and its end closure cap 126.

An alternative and preferred form of hand and ejector mechanism is shown in Figures 22, 23, and 24, this hand being particularly reliable in operation in connection with compressible fruit, such as fruit of the citrus variety. In this form the grasping portion of the hand is cup shaped and provided with stiff spring fingers 127 having inwardly directed terminal gripping extremities 127a projecting through openings adjacent to the mouth of the cup. To additionally grip the skin of the fruit and prevent rotation of the fruit relative to the cup under the action of the juice extracting reamer, the wall of the cup is provided with inserts 128 having sharp pointed or toothed projections 128a, the teeth of these inserts being inclined in a direction opposite to that of the direction of rotation of the reamers so that, the greater the tendency to rotate the fruit under the action of the reamers, the deeper the teeth will sink into the skin and the more firmly it will be held.

In this modification, the ejection plunger 129 is mounted in an enlarged bore extending inward some distance from the bottom of the cup into a hollow stem 130 of the hand. From this enlarged bore, a smaller bore extends inwardly through an opening in the shaft 51 and in this reduced bore is mounted for sliding movement a reduced plunger part 131 carrying the cam follower 132 coacting with the cam 122. In this case the plunger operating ejector spring 133 is inserted between the end of the plunger 131 and the closing cap 126. To limit the outward movement of the plunger part 129 a cylindrically headed screw 134 is threaded into the end of the plunger part 131, the head of this screw fitting within a cylindrical bore extending in from the outer end of the plunger 129. The spring is cocked in the same way as in the previously described modification and drops off the cam 122 in the same fashion. In the view shown in Figure 22, the plunger is shown in full lines in the cocked position and in dotted lines in the position it assumes upon ejection of the skin.

During the ejection, cam faces 135 on the plunger 129 engage sliding pins 136 to force the spring fingers 127 outwardly to release the skin, so that the plunger, in its final outward movement, engages the inner ends of the pins 136 through its cylindrical portion and thus retains the spring fingers 127 in their outward position with their inwardly directed gripping extremities 127a withdrawn from the cup until the fruit drops into the cup to force the plunger inwardly against the friction of the pins 136 under the influence of spring fingers 127 and again release the spring fingers to their gripping action.

In the decent of the hands to engage the fruit part held thereby with the reamers, it is desirable that the spring fingers 127 be released early in the juice extracting process so that the fruit part may be forced into the cup to cause the skin to be gripped firmly by the teeth 128a of the serrated inserts 128 which hold it firmly against rotation in the cup under the torque of the reamer. To this end, a second set of mechanisms for releasing the spring fingers 127 from their gripping hold is provided. This second set of means comprises the cams 137 located in recesses directly below the spring fingers 127 and adjacent their points of attachment by screws 138 to the stem 130 of the hands. These cams are each non-rotatably secured to a spindle 139 the ends of which project from the opposite sides of the spring finger as shown in Figure 23 and have there rigidly secured to them the arms 140. The opposite ends of these arms, which are arranged to project outwardly of the hands, are rigidly secured by a corresponding spindle 141 to the center of which is secured an extension 142 of the arms 140 terminating in a ball-shaped end 143.

As shown in Figure 22, the cams 137 which are oval in contour, lie with their long axes parallel to the axis of the stem carrying the hand. Coil springs 144 each connected at one end to the spindle 141 and at their opposite ends to the outer face of the cup normally retain the cams in the inoperative position. However, as the hand descends to engage the fruit grasped thereby with the reamer, the ball ends 143 of the arms 140—142 engage an annular plate 145 supported some distance above the reamer, as by screws 145a and spacers 145b shown in Figures 20 and 21, causing the arms to swing upwardly and outwardly and thus rotating the cams 137 to force the spring fingers out of engagement with the fruit in the grasp of the hand. In the further relative approach between the hand and the reamer the fruit is firmly seated in the cup and gripped by the teeth of the serrated inserts 128. Upon withdrawal upwardly of the hand from the reamer the springs 144 return the cams to their inoperative positions thus permitting the spring fingers 127 to again firmly grip the skin within the cup through their gripping extremities 127a.

*The reamers and the associated juice-collecting parts*

Figure 20B:
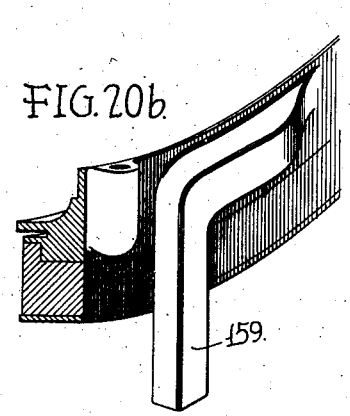
Figures 20a and 20b are enlarged detail perspective views of portions of the juice collecting channel surrounding the reamers, showing respectively, inside and outside views thereof in the region of the downwardly extending juice ejection spouts.
Figure 20A:
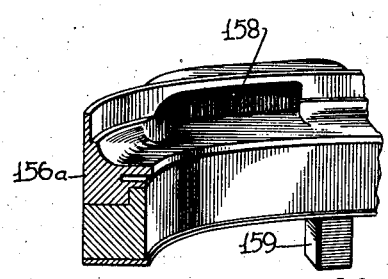
Figure 20:
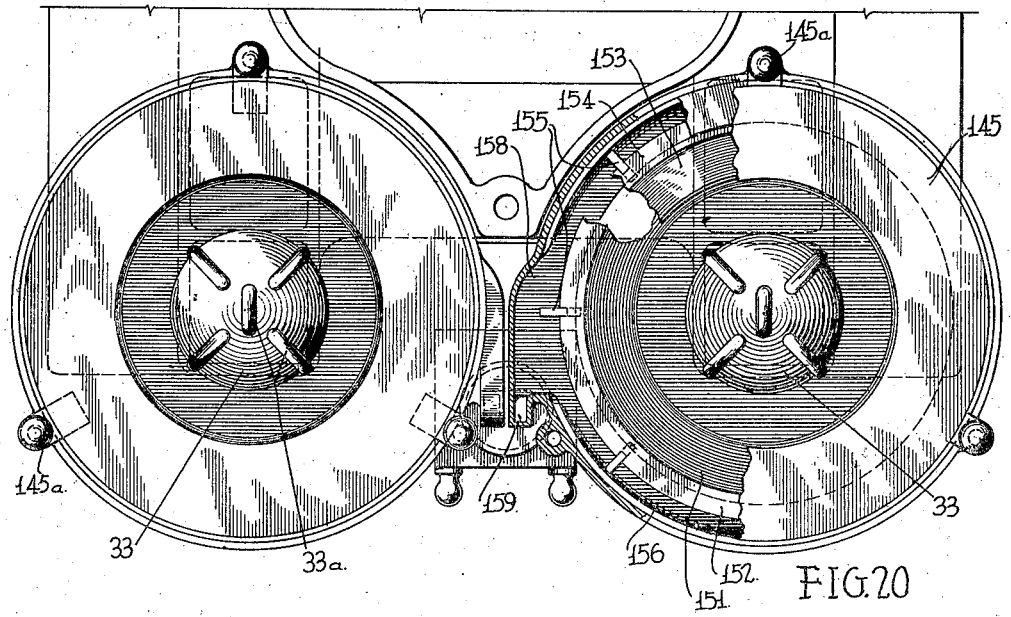
Figure 20 is a plan view, parts being shown in section, of the reamers and the housings surrounding them.
Figure 21:
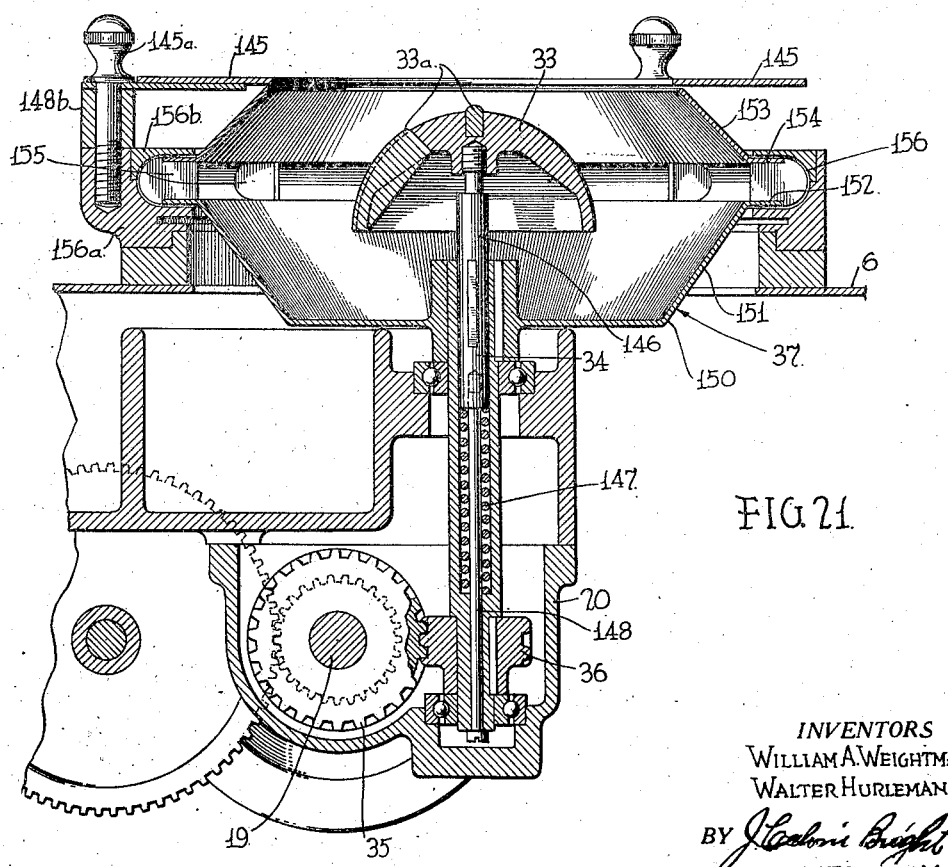
Figure 21 is a vertical section view taken substantially along the line 21—21 of Figure 20, showing a reamer and its associated housing and parts of their mounting and driving means.

This mechanism is shown most clearly in Figures 20, 21, and 22. The dome-shaped reamer 33 corresponding to the shape of the cup of the hand, but of smaller dimensions to accommodate the skin of the fruit between the reamer and the cup in their closest approach position, is screw-threadedly attached to the upper end of a reduced extension 146 of the reamer shaft. The reamer's domed surface is preferably formed with radially extending, rounded projections 33a protruding slightly from its face to aid in the extraction of the juice without unduly lacerating the pulp. The shaft extension 146 slides within the enlarged portion 34 of the reamer shaft, which is hollowed out to receive a spring 147 yieldingly pressing the shaft extension and reamer upward. A guide pin 148 extends upwardly through the reamer shaft 34 into a bore at the lower end of the extension 146. Obviously, the reduced extension is keyed to the reamer shaft to rotate therewith.

The purpose of the spring 147 is similar to that of the spring 65 in the mechanism for approaching the hand toward the reamer, namely, to cushion the parts in the initial stages in the extraction of the juice from the fruit part grasped by the hand and to prevent a too rapid feed of the reamer into the fruit. The springs cushioning both the reamer and the hand in their approach movement, also allows these parts in their final approach movement, to accommodate themselves to fruit having varying thicknesses of skin.

To catch and collect the juice, the reamer 33 is surrounded by a housing 37, this housing including a dished lower part 150 keyed through an elongated hub portion thereof to the upper end of the hollow reamer shaft 146, so that it rotates at the relatively high speed of the reamer shaft. This dished lower part has a flat bottom and a conical outer wall 151 which is flanged outwardly in its margin at 152. The upper portion of the housing is formed by a reversely conical wall 153 having a central opening through which the hand may pass in its downward movement and which is correspondingly outwardly flanged in its outer margin at 154. The two parts 151 and 153 of the housing are rigidly secured together in their flanged margins by a plurality of radial vanes 155 spacing the flanges 152 and 154 and welded or brazed or otherwise firmly secured to these flanges, thereby constituting two parts of the housing a unitary whirling balanced structure about the shaft 24 of the reamer. These vanes have outer semi-circular extensions which fit an annular fixed trough 156 of similar contour and constructed for convenience of manufacture and assembly of several machined parts which trough is mounted on the main transverse plate partition 6. The two parts 156a and 156b forming the trough 156 may be secured in assembled relation by the screws 145a and spacers 145b already referred to.

As shown in Figures 20 and 20a the trough 156 widens out radially at the point 158 and this widened part leads to a vertically extending spout 159 through which the extracted juice passes into a cup positioned therebelow.

The operation of the juice collecting housing should be evident from the foregoing description of its construction. As the juice is extracted by the relative approach of hand and reamer, it falls upon the walls of the rapidly whirling housing, and it is thrown out by centrifugal force into the trough 156, not only the juice being thrown out but also the seeds and any pulp which is loosened. All of this material is then swept around by the rapidly rotating vanes 155 forming part of the whirling housing unit into the widened portion 158 of the trough and forced at high velocity down through the spout 159. The rapid rotation of the housing makes it self-cleaning in operation, an important consideration, and the juice is so aerated in the rapid whirling motion that it is discharged from the spout in a condition resembling a carbonated beverage, which adds to the enjoyment of the drink and brings satisfaction to the customer.

*The filled cup push-out and refuse disposal mechanism*

When the extracted juice leaves the spout 159, it passes into an inverted cup shaped strainer receptacle 160, which catches the seeds and any pulp mixed with the juice. The strainer receptacle and the parts associated therewith, as is clearly shown in the perspective view of Figure 42 and the plan view of Figure 40, are supported from the front wall 161 of the main frame casting 11, through which the machine is supported in the cabinet, as already described. The strainer receptacle itself is directly supported by the rods shouldered at 162, see Figure 40, secured to the front wall of the casting and projecting forwardly therefrom. The platform is clamped against the shoulders 162 on the rods by cap nuts 165 screwed on their outer reduced ends.

As shown in Figures 5, 33, 40 to 42, the bottom of the strainer receptacle is open to allow the juice to pass through it into the cup C. To prevent the passage of the seeds and pulp, a number of closely spaced parallel pins 166, are located in parallel openings provided for them in the platform 163 and the strainer receptacle 160, the pins being secured at their inner ends to a cross bar 167 mounted for sliding movement upon the rods 164.

The means for imparting such movement to the cross bar and the pins connected therewith is best shown in Figures 40 to 42, and comprises a rock shaft 168, borne by the spaced ears of a bracket 169 bolted to the wall 161 of the casting 11. This rock shaft carries centrally between the ears of the bracket a forked arm 170, which engages a pin 171 mounted between spaced upwardly projecting ears 172 on the cross bar 167. Another arm 173 is secured to one end of the rock shaft 168 and connected by a link 174 to a lever 175, which is pivoted intermediate its ends on a pin passing through the slotted end of a stud 176 secured in the main casting 11. The lower end of this lever is connected by a ball joint to a link 177, which is in turn connected by another ball joint to a crank pin 178 to a cup 179 telescoped with the projecting lower end of the left hand operating shaft 43 and secured to it by a lock screw.

Figure 33:
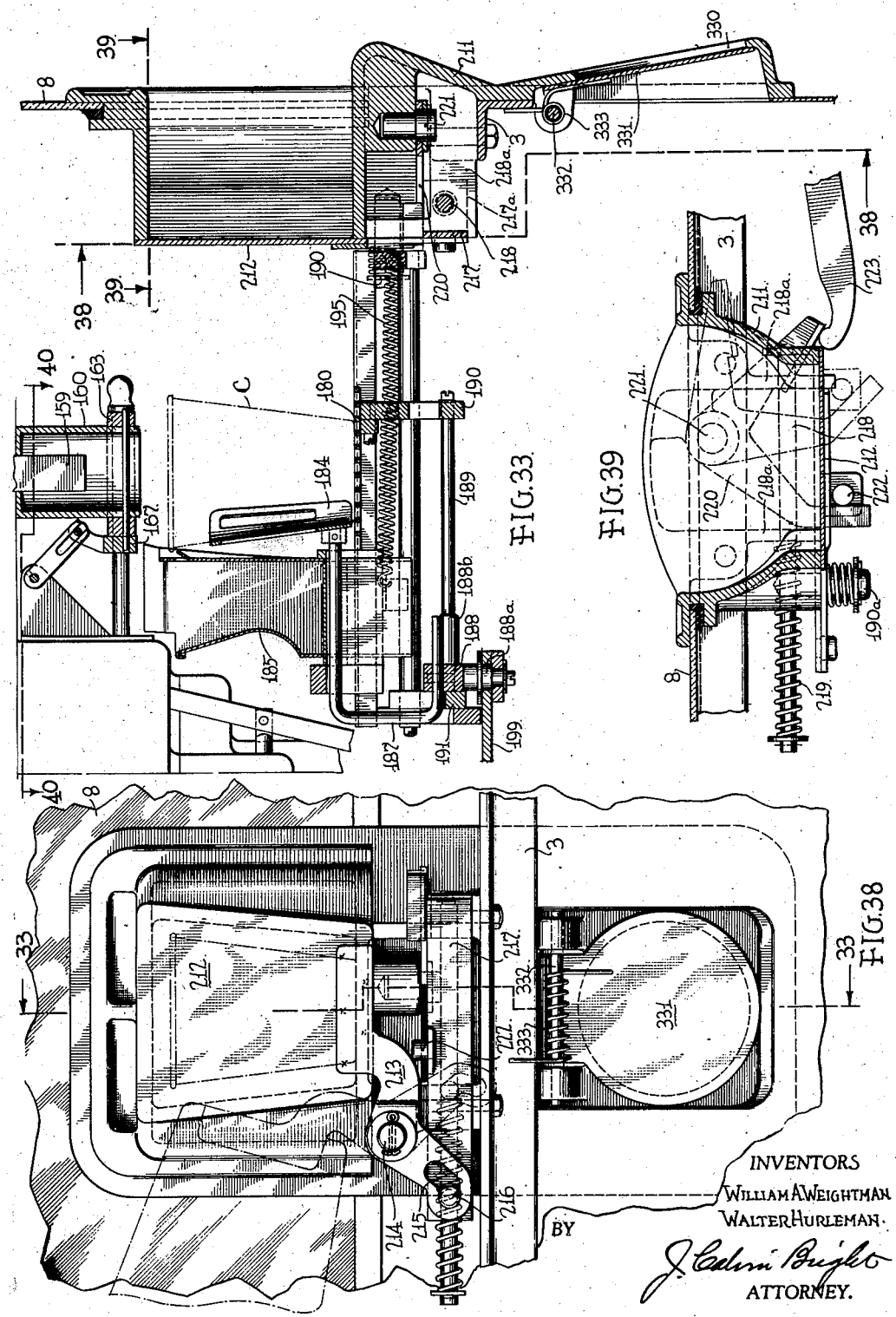
Figure 33 is an enlarged fragmentary vertical sectional view through the gate at the front of the machine and the cup push-out mechanism arranged adjacent thereto, the section being taken approximately on the line 33—33 indicated in Figure 38, this view showing the parts in the filling position.

By this construction it will be evident that, as the shaft 43 rotates, the cross bar carrying the strainer pins 166 will be reciprocated to withdraw the strainer pins from the strainer cup at each revolution of the shaft, and to return them again to the operative position shown in Figure 33, the operation being timed to have the strainer closed during the juice extraction and open when it is desired to release the refuse from the strainer cup.

The cup C, during the filling operation rests on a cup receiving platform in the form of a perforated plate 180 which is longitudinally slidable on a frame 181 bolted to a plate 182 extending across the front of the cabinet 10 at about the level of the cup receiving platform 180 and secured to the side walls of the cabinet, a longitudinal way being provided in the plate to permit the sliding movement of the platform. The frame 181 carries two spaced parallel guide rods 183 upon which the platform is guided in its reciprocatory motion.

Figure 34:
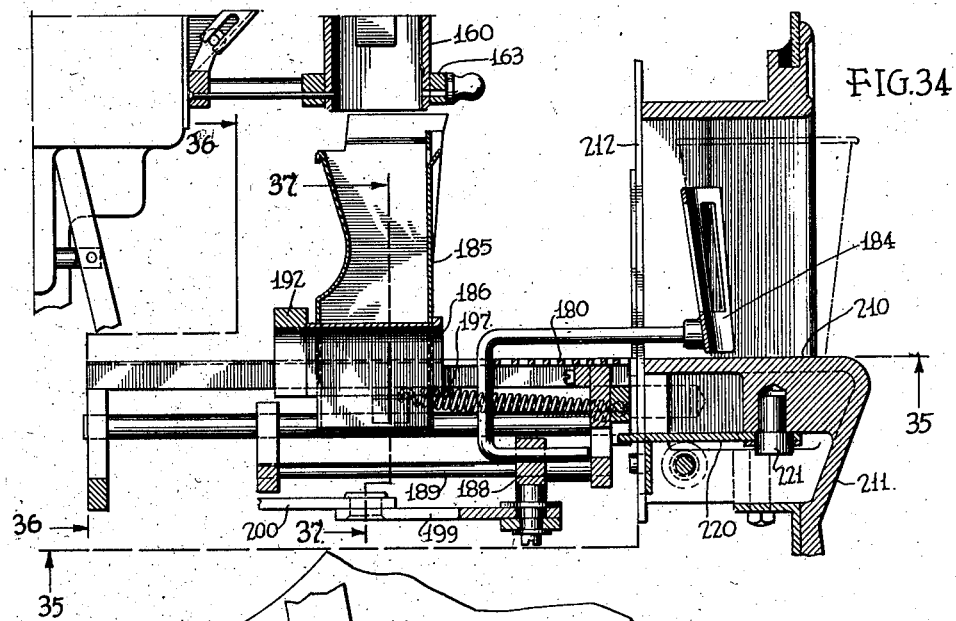
Figure 34 is a similar view showing the parts in the push-out position.
Figure 36:
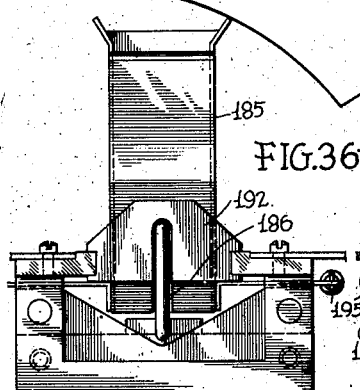
Figure 36 is a rear elevation as the parts would appear if viewed along the line 36—36 of Figure 34.
Figure 37:
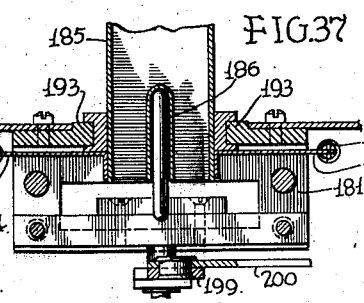
Figure 37 is a fragmentary vertical transverse sectional view taken substantially along the line 37—37 of Figure 34 through the refuse chute.

Referring now to Figure 33, the curved cup push-out plate 184 is normally in engagement with the rear wall of the cup on the receiving platform 180 and immediately in back of the push-out plate there is mounted a refuse chute 185, this refuse chute having a passageway 186 through its lower portion for permitting the passage of the U-shaped rod 187 rigidly connected to the back of the push-out plate, see also Figures 34, 36, and 37. The lower arm of the U of this rod is clamped to a sliding carrier 188 mounted to slide on the guiding rods 189, supported in the brackets 190 and 191, depending from and guided by the guide rods 183 and movable with the movable receiving platform 180.

Figure 35:
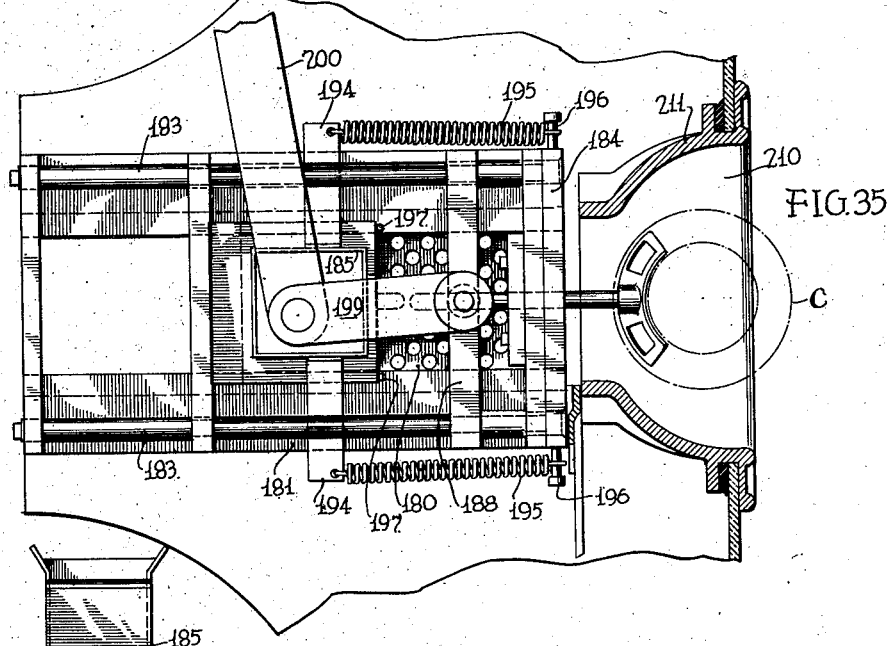
Figure 35 is a bottom plan view, parts being in section, of the parts shown in Figure 34, the view being seen as it would appear if the section were taken along the line 35—35 of Figure 34.

The refuse chute 185 is mounted in a carrier 192 guided in the ways 193 on the frame 181, also for sliding movement. As is best seen in Figures 35 and 37, the carrier 192 has laterally projecting arms 194, the outer ends of which are connected by coiled tension springs 195 to laterally projecting pins 196 secured to the forward end of the frame 181. When the parts are in position shown in Figure 33 the springs are under tension, and cause the refuse chute to follow the movement of the cup push-out plate 184 in the forward movement of the cup until the carrier strikes the stop pins 197, see Figures 34 and 35, projecting from the lower faces of the ways guiding the carrier 192. In this position the chute is directly under the strainer receptacle 160 and the strainer pins 166 are withdrawn and permit the refuse to drop down through the chute into a large refuse receptacle 198, see Figures 2 and 3, in the bottom of the cabinet.

The mechanism for operating the cup push-out and the refuse chute, whose movements are controlled by the cup push-out is best understood by reference to Figures 25, 26, 28, 33, 34, and 35. It comprises a link 199 connected to a downwardly projecting pin 188a on the sliding carrier 188, this link being pivotally connected to the free end of the lever 200, pivoted at its opposite end on a pin 201, secured to a bracket fastened to the side of the cabinet. Some distance inwardly from its pivoted end the lever 200 is connected by a link 202 to the outer end of a lever 203, which is pivoted near the center by the pivot pin 204 secured in the lower casting 10 bolted to the underside of the main casting 11 of the machine frame. The end of this lever 203 opposite the link 202 carries a cam follower 206 which bears against a cam 207 secured to a sleeve 206 keyed to the main cam shaft 15. To force the cam follower against the cam and to return the cup push-out, the cup receiving platform, and the refuse chute from the outer position indicated in Figures 34, 35, and 28, to their inner position indicated in Figures 25 and 33, against the tension of the coiled springs 195, there is provided a series of six coiled springs 208, see also Figure 26, secured at one end to the right hand vertical corner frame member 2 of the cabinet and at the opposite end to a bar 209 secured to the front face of the lever 203 near its connection with the link 202. The tension of the springs 208 much exceeds the tension of springs 188 and the effort required to return the parts from their outer to their inner positions.

From the immediately preceding description and the figures referred to it will be seen that the actuating cam 207 has a rather abrupt rise tapering off less abruptly causing the cup push-out plate 184 to be moved forwardly quickly but with a slower motion as it approaches the forward position shown in Figure 34 the refuse chute carrier following it under the action of the springs 195 until it strikes the stop pins 197. The carrier 188 is guided on the rods 189 through forwardly projecting sleeves 188b connected to it, and these sleeves, in the final outward movement of the carrier 188 engage the forward depending bracket 190 and move the carrier and bracket outwardly, the final outward movement of these parts being cushioned, by a spring buffer 190a, see Figures 33 and 39, carried by a casting 211 secured in its margins to an opening in the front wall paneling of the cabinet and to a transverse frame member 3 thereof.

After the cup push-out has reached its outer position, see Figure 34, the cam follower reaches a sudden drop off in the cam 207, resulting in a sudden withdrawal of the push-out plate 184 within the cabinet, after which the carrier 188 strikes the depending bracket 191 movable with the receiving platform and the latter engages the front of the refuse chute carrier 192, and the push-out plate 184, receiving platform 180, and refuse chute 185 all move together to their inner position shown in Figure 33.

By reference to Figures 34 and 35, it will be seen that the cup C is delivered on a platform 210 outside the cabinet through an opening which flares outwardly and permits the cup to be readily grasped by the hand of the customer. This platform and opening are provided in the casting 211, secured centrally to the front wall of the cabinet in the manner described. The glass panel 8 surrounds the upper portion of this casting, see Figure 1, its margin extends into a channel in the adjacent margin of the casting and is yieldingly locked therein by a rubber or other yielding filler as shown in Figures 33 to 35.

*The gate and its operating mechanism*

Referring now to Figures 33, 34, 38, and 39, it will be seen that the rear face of the upper portion of the casting 211, around the opening is machined to a flat plane surface and a gate 212 normally closes tightly against this machined surface. The gate 212 is mounted on one arm of a lever 213 integrally secured thereto, this lever being pivoted on the pin 214 projecting from the rear surface of the casting. The arm of the lever remote from the gate is provided with an angular slot 215 into which projects a pin 216 on the gate operating slide 217. When this slide is reciprocated the gate will be swung from the full line closed position shown in Figure 38 to the dotted line open position and vice versa. The slide 217 is guided in ways on the casting 211 and has secured to it through a lateral projection 217a thereon for movement therewith a guide rod 218 suitably guided in transverse holes provided therefor in spaced vertical inwardly projecting walls 218a on the casting, and between a washer secured to the projecting end of the guide rod and the adjacent wall 218a of the casting, see Figure 39, the rod is surrounded by a coil spring 219, this coil spring acting normally to swing the gate to its closed position.

Figure 28:
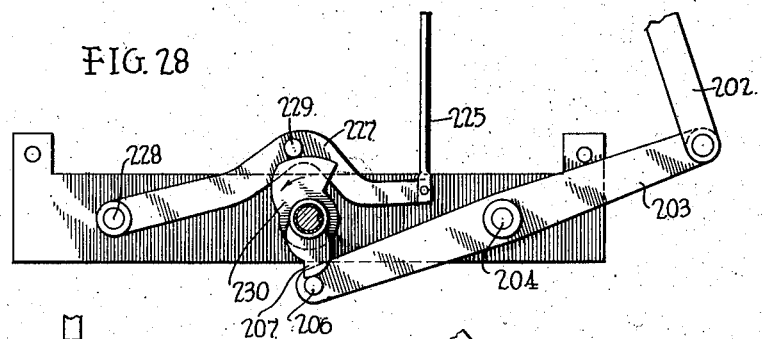
Figure 28 is a fragmentary sectional plan view taken approximately on the line 28—28 of Figure 26 showing the cup push-out cam and associated parts and the gate operating cam and its associated parts.

The slide is operated to open and close the gate by the mechanism shown in Figures 25, 26, 27, 33, 34, and 39. A bell crank lever 220 pivoted on the stud 221 secured in and projecting from the casting 211, has one arm bearing against a vertically projecting stud 222, on a lateral projection from the top of the slide 217. The opposite arm of the lever is formed with a flat face which is engaged by the curved end of a lever 223, pivoted on a vertical pivot 224 on a bracket secured to the side of the cabinet, see Figure 25. The lever 223 is engaged near its free end by a push rod 225 guided by bracket 226 projecting inwardly from the front wall of the cabinet. The end of the push rod is preferably slotted and receives the lever within the slot. At its rear end the push rod is pivotally connected to the free end of a lever 227 which has a bend in it where it passes around the cam shaft 15 and is pivoted on the opposite side of the cam shaft from its free end on the pivot 228, carried by the casting 10, see Figure 26. This lever carries a vertically projecting cam follower pin 229 which is held against the gate operating cam 230 on the sleeve 206 keyed to the cam shaft 15 under the action of the spring 219. As shown in Figures 25 and 28 this cam is so shaped as to have a dwell of considerable duration after the follower has reached the high point of the cam and during this time the gate will be held open. This is to insure that the gate will be held open a sufficient length of time to permit the cup and its push-out to pass out through the gate and for the push-out to again return, within the cabinet. As shown in Figure 28, the push-out cam 207 and the gate operating cam 230 are in the position in which the gate is open and the cup push-out is almost at its outer position. From the relative position of the cams on the cam shaft, it is evident that the gate is held open until the cup push-out has returned within the cabinet after the cam follower 206 has dropped off the high point of the cup push-out cam 207.

*The empty cup release and transfer mechanism*

The empty cup feed mechanism is best disclosed in Figures 2, 3, 25, 26, 29, and 30. In order to avoid an undue height in the cup dispenser which would increase the height of the cabinet, the cup dispensers 231 are preferably arranged in duplicate on opposite sides of the front portion of the cabinet and mounted in the transverse plate position 6 above the plate 182 extending across the cabinet at the height of the perforated platform receiving the cup during the filling operation. As shown they extend at the top through openings in the transverse plate 5. These dispensers are of well known construction adapted to drop one cup at a time to the plate 182 upon each actuation of a lever 232 projecting laterally from each of their lower ends. Since only one cup is required during one cycle of the machine, which is measured by one rotation of the cam shaft 15, the mechanism for releasing the cups from the dispensers is arranged to actuate the dispenser levers alternately for each succeeding cycle of the machine. A convenient means for accomplishing this is the cam 233 mounted on the sleeve 234 surrounding and rotating on the lower end of the cam shaft 15, see Figure 26.

The mechanism for actuating the cup release from the dispensers and the cup transfer mechanism for transferring the cup from the dispensers to the filling position is carried by a plate 235 secured against collars 236 on the pivot bolts 204 and 228 by nuts screwing on the ends of these bolts as shown in Figure 26. The ends of this plate have downturned portions 237, and a short plate 238 secured centrally to the plate 235 has similar downturned ends 239. These downturned ends 237 and 239 serve as supporting and guiding means for the actuating mechanism to be presently described.

Since the cam 233 has but one high point from which there is a sudden drop off, and the cup dispensers are to be operated alternately, the cam followers 240 and 241 are arranged at diametrically opposite points of the cam and the cam 233 is driven at half the speed of the cam shaft 15.

This reduced speed drive is conveniently obtained through the planetary gearing shown in Figures 26 and 27. In these figures the large internal gear 242 is carried by an elongated hub portion 242a to which the cam sleeve 234 is splined while the sun gear 243 is carried by a sleeve keyed to the cam shaft 15, this sleeve also carrying the cams 207 and 230, and the planetary gear 244 meshing with the gears 242 and 243 are fixedly mounted on stud shafts 245 secured to the overlapping plates 235 and 238 and locking these plates together as shown in Figure 26.

The cam followers 240 and 241 are fixedly mounted, respectively, on the parallel sliding rods 246 and 247 which are guided for sliding movement on the downturned ends of plates 235 and 238. By reference to Figure 3, showing cam follower 240 in detail, and Figure 30, it will be seen that each cam follower comprises an upwardly extending lug forming part of a transverse bar fixed to the rod directly beneath the lug and guided for sliding movement on the parallel rod. As the followers ride up over the cam, springs 248 and 249 surrounding, respectively, the rods 246 and 247 and bearing, respectively, at their inner ends, against collars 250 and 251 on said rods, and bearing, respectively, at their outer ends, against the right and left downturned ends of the plate 237, are successively compressed and released, when the respective cam followers drop off the high point of the cam 233. The rod 246 is connected to the operating lever 232 of the right hand cup dispenser 231 by a wire or other flexible connection 252 passing over pulleys 253 and 254 mounted at the right hand side of the cabinet. Similarly, the rod 247 is connected by a wire or other flexible connection 255 passing around a pulley 256 mounted on the left hand side of the cabinet to a connection with the lever 232 associated with the left hand dispenser. The terms right and left are here used with reference to Figure 30 and not with reference to the front of the machine.

From this description it will be seen that one of the springs 248 and 249 will be fully compressed each half revolution of the cam, permitting its associated cup dispenser lever 232, to return to normal position. When the cam follower passes beyond the drop off point of the cam, the cup dispenser associated therewith is operated by its spring to release the cup. Since the cam makes but half a revolution for each revolution of the main cam shaft 15, a cup will be released from one of the dispensers at each revolution of the main cam shaft 15, which release will take place alternately from the two dispensers.

In view of the alternate release of the cups from the dispensers, the cup transfer mechanism for moving the cup from a position beneath the dispensers to the central filling station over the perforated platform 180 is similarly alternately operative. This mechanism is most clearly shown in Figures 25, 26, and 29.

It comprises a cam 257 mounted on the sleeve 234 to rotate at half the speed of the main cam shaft 15. This cam operates upon rods 258 and 259 which are slidably mounted in the downwardly turned ends 237 and 239 of the plates 235 and 238. Springs 260 and 261 encircle, respectively, the rods 258 and 259. The inner ends of these springs bear respectively against collars 262 and 263 on the rods 258 and 259 while their outer ends bear respectively against the right and left hand downturned ends 237 of the plate 235. The outer ends of these rods 258 and 259 are connected by a pin and slot connection to the short arms of the respective cup transfer levers 264 and 265. These levers are pivoted, respectively, on pin 266 and 267 mounted in the lateral extensions of the plate 235 as shown in Figure 26. The long arms of the levers 264 and 265 are offset upwardly from their short arms so as to lie and swing on top of the plate 182 upon which the cups are deposited when released from the dispensers, as shown in Figure 25. The free ends of the transfer levers 264 and 265 are formed respectively with pockets 268 and 269 open on their inner sides and conforming generally to the shape of the cup C.

Figure 29:
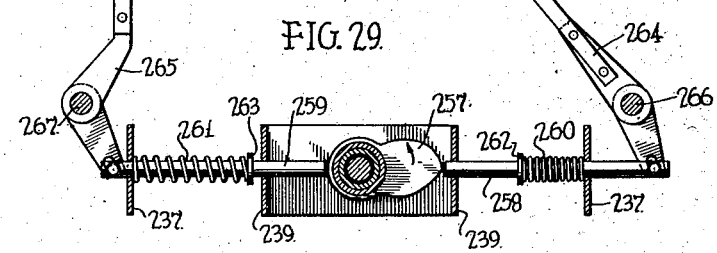
Figure 29 is a horizontal transverse sectional view taken substantially on the line 29—29 of Figure 26 showing the cup transfer can and its associated parts.
Figure 30:
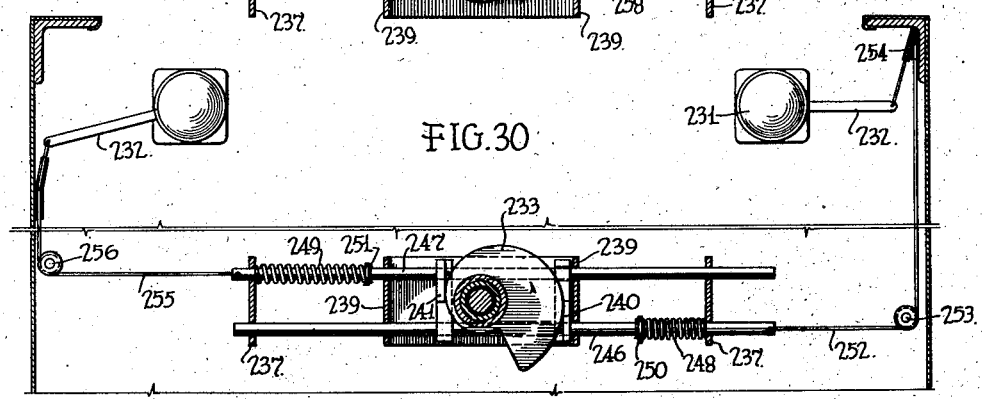
Figure 30 is a horizontal transverse sectional view taken substantially on the line 30—30 of Figure 26 showing the cup release mechanism.

By reference to Figure 29, it will be obvious that the cup transfer levers will be alternately actuated by the cam 257 to transfer a cup from beneath the dispensers to the filling position, and that the springs associated with the respective levers will return them to their position beneath the dispensers to receive the cup therefrom.

The fruit feeding mechanism

The fruit feeding mechanism may comprise a charging or supply chamber or hopper clearly shown in Figures 3, 44, and 45 as being formed by the transverse partition plate 5 near the top of the cabinet, the side walls of the cabinet, and the top of the cabinet, the size of this chamber being sufficient to house quite a large number of fruits so that the machine will not require frequent recharging with fruit. As clearly shown in Figures 3, 43, and 44, the bottom of this chamber is formed by an inclined false bottom 270 sloping from front to back so that the fruit may roll into a well 271 forming the bottom of the chamber along the real wall of the cabinet. As shown in Figure 45, the bottom of this well is also normally inclined sloping from right to left, as in that figure. This bottom may comprise a hinged member 272 pivoted on the pin 273 at the right-hand side of the cabinet, as shown in Figure 45, and normally resting at its opposite end on a stop pin 274, the free end of the hinged bottom having secured to it an angular projection 275 extending into a vertical elevator shaft 276 in transverse alignment with the well 271. Both the well and this elevator shaft are of a dimension not greatly exceeding the diameter of the fruit to be processed. An opening 277 is provided in the wall of the elevator shaft just above the inclined bottom 272, this opening being of a size sufficient to allow the passing of one fruit at a time into the elevator shaft. In the sections of Figures 46 and 47 it will be seen that this shaft is square in cross section and receives within it a correspondingly shaped sliding elevator 278 provided with a closed top formed with a grooved seat, see Figure 45, to receive a fruit, this top being normally at the level of the lower end of the inclined bottom of the well.

By this construction it will be seen that the fruit is fed by gravity to the elevator one fruit at a time and after a fruit has taken its position on the elevator, it is raised to the top of the elevator shaft by a system of links and levers connected between it and a sprocket gear 279 mounted for rotation on a transverse bar 280 at the rear of the cabinet. This lever and link system comprises a lever 281 hinged to a bracket 282 at one side of the cabinet and having its opposite end connected by a link 283 to a rocking cross head 284 pivoted in the side walls of the elevator adjacent its lower end, see Figures 45 and 46. Between its ends, the lever 281 is connected by a link 285 to the rim of the sprocket gear 279.

To permit the vertical movement of the lever and to guide it in such movement, the free end of the lever moves in a slot 286 provided in the side wall of the elevator shaft. It will be obvious that with the rotation of the sprocket gear 279 the elevating mechanism hereinbefore described will be moved from the full line position shown in Figure 45 to the dotted line position with the top of the elevator adjacent the top of the elevator shaft.

In this movement, the bottom of the slot 274a in the elevator 278 into which the projection 274 secured to the bottom of the hinged bottom 272 extends, strikes this projection during the last of the upward movement and subjects the fruit in the supply chamber, by lifting the bottom 272, to a shake up. The effect of this is to prevent jamming of the fruit in its downward gravity feed and insure the feeding of a fruit into the elevator shaft above the elevator at each vertical reciprocation thereof.

The rotation of the gear 279 is effected from the armature shaft of the motor 14 by any suitable reduction gearing including the shaft 287, a sprocket pinion 288 of said shaft, and a chain 289 driving the gear 279 from this pinion. The gear reduction is such as to elevate one fruit at each cycle of operation of the machine.

As shown in Figure 44, the top wall of the elevator is inclined laterally and the elevator shaft communicates at its upper end with a laterally and downwardly extending chute 290 so that when the elevator reaches its upper position the fruit therein will roll off it into the chute into the downwardly inclined portion of the chute whence it will proceed by gravity down to the bottom of the chute. The bottom of the chute shown most clearly in Figures 48 and 49 opens through a casting 291 forming an extension thereof which has a lip projecting through and opening in the transverse wall plate 5.

At this point the fruit is stopped by a suitable stop and release mechanism arranged to release one fruit at a time to drop down through the opening in the lower end of the chute into the hand 38 arranged directly below there. Such mechanism may comprise a series of stop plates 292 pivoted at one end on the casting 291 through the pivots 293 and operating through slots in the casting so as to normally project within the opening of the chute sufficiently to stop passage of a fruit. The actuating means for these stop plates may consist of a ring 294 mounted just below the plates in an annular way in the casting, and having upwardly projecting pins 295 thereon extending through slots 296 in the casting, which slots are concentric with the ring, and into slots 297 in the stop plates, the latter slots being angularly related to the slots 296, see Figure 48.

Figures 31, 32:
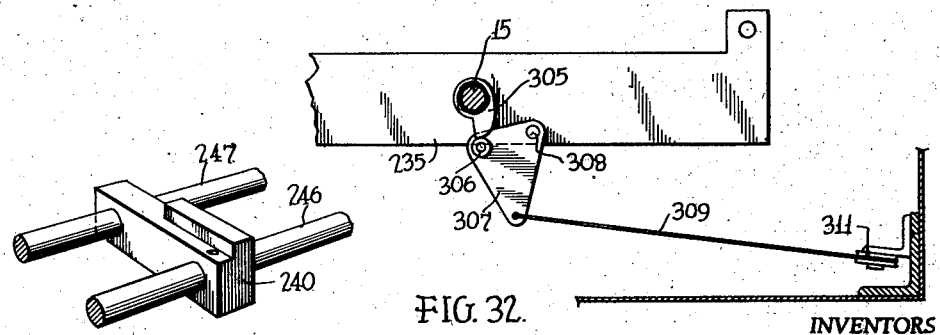
Figure 31 is a detail perspective view of the right hand cam follower and its associated rods shown in Figure 30.
Figure 32 is a horizontal transverse sectional view, taken substantially on the line 32—32 of Figure 26, showing the fruit release cam and associated parts.

From this it will be seen that, if the ring 294 is rotated from the full line position of the parts shown at the left of Figure 48 to the dotted line position, the stop plates will be cammed outwardly to inoperative position, releasing the fruit to drop through the opening. This rotary movement is imparted to the ring in the following manner. The ring is provided with the laterally projecting ear 298 which is pivoted at 299 to a clevis 300 secured to one end of the rod 301 guided in the brackets 302 and 303 secured to the plate partition 5. Between the clevis and the bracket 302 the rod is encircled by a coil spring 304. This coil spring is placed under tension by a cam 305 on the cam sleeve 206 keyed to cam shaft 15, see Figure 32, the follower 306 in engagement with the cam being mounted on a triangular plate 307, which, in turn, is pivoted through the pivot pin 308 on the plate 235. The pivot 308 and the follower 306 are mounted adjacent two angles of the triangular plate while the third angle is connected by a wire or other flexible connection 309, passing over the guide pulleys 310 and 311 mounted on brackets at the side of the cabinet, to the end of the rod 301.

From this construction it will be seen that, as the follower 236 rides up the cam 305, the spring 304 will be placed under tension. The cam has a sudden drop off and when the follower drops off at this point the spring is released to rotate the ring 294 in counter clockwise direction as seen in Figures 43 and 48, thereby affecting the release of the fruit.

Should more than one fruit be located in the vertical portion of the chute 290 at the time of such release, means may be provided to prevent the release of more than one. Such means may comprise a number of levers 312 pivoted on horizontal pivots 313 on the casting 291. There is one of these levers for each of the stop plates 292 and they operate through slots in the casting. Their upper and longer arms are normally pressed inward by springs 314 secured to the casting above the levers and having their lower ends pressing against the levers to force them inwardly to the position indicated by dotted lines in Figure 49. The lower short arms of these levers cooperate with upwardly projecting lugs 315 on the stop plates 292. When the stop plates are in the position shown in Figures 43 and 48, the lugs 315 hold the levers in the full line, Figure 49, position, permitting the passage of a fruit down between them. When the stop levers are swung into the release position, the lugs 315 are moved outwardly and the springs 314 press the upper arms of the levers 312 inwardly to the dotted line position. In this position they prevent the release of a second fruit.

To keep the fruit in the charging or hopper chamber at the proper temperature there is preferably provided some form of refrigerating device. This is indicated in more or less diagrammatic form in Figures 31 and 32 by the box 316 which can be filled with ice at the time the machine is charged with fruit or at any suitable time, or in lieu of ice, any suitable refrigerating coils (not shown) may be utilized.

In order to bring the machine to a stop after a cycle has been completed, a suitable switch is placed in the motor circuit, this switch being preferably associated with the main cam shaft 15 making one revolution during a cycle. To this end, this cam shaft has a disc 317 keyed to it, this disc being formed at one point of the circumference with a V-shaped notch 318, see diagram in Figure 51, and Figure 26. Against the periphery of this disc a spring contact 319 is pressed, this contact is mounted on a plate 320 secured to the downward projections of plate 238 and forming a bearing for the lower end of the gear hub 242a and the cam sleeve keyed to it. A second spring contact 321, also mounted on the plate 320, of the switch normally bears against the back of the contact 219 to close the switch. When the contact 319 comes opposite the notch 318 in the disc, it springs inwardly into the notch and breaks its contact with contact 321, thus opening the motor circuit and stopping the motor. The contacts are insulated from each other and the plate 320 by a suitable insulating pad 320a, and contact 319 engages disc 317 with a V-shaped insulating block.

The momentum of the cam shaft 15 carries it around a small fraction of a revolution, after the motor ceases to drive it, and during this overrun the contact 319 moves out of the notch 318 and the contacts 319 and 321 are again pressed together to close the switch. This will not start the motor a second time since provision is made, as will be hereinafter described, to break the motor circuit at a second switch as soon as the switch just described is opened by the dropping of the V-shaped block of contact 319 into the notch.

THE OPERATION OF THE MACHINE

From the foregoing description, the operation of the machine is perhaps best understood by reference to the timing chart shown on Figure 50 and the wiring diagram shown in Figure 41. The machine is so designed as to complete its cycle, as indicated by the timing chart, in one rotation of the cam shaft 15. The dropping of a coin into a slot provided at the front of the cabinet starts the machine by the closing of a switch 322 which is closed momentarily by any suitable coin controlled mechanism, not shown. The closing of this switch completes the circuit to the opposite sides of the line to which the machine may be connected by plugging into the usual house wiring circuit or any other suitable source of electric energy, and the closing of this circuit operates a relay 323 to close the motor circuit and at the same time energizes the solenoid 32 to withdraw the stop pin 32a in the manner already described, allowing the pawl 26 to lock the worm gear 23 to the intermittent gear 28 and thus complete the drive from the motor to the cam shaft 15.

In the timing chart shown in Figure 50, the top of the figure, as indicated, represents the starting and stopping position, the outer circle indicates the movement of the hands from start to stop and similarly, the next circle represents the movements of the cup transfer. The third and double circle represents the movements of the cup pushout and refuse chute, while the fourth represents the strainer pin movements and the fifth indicates the time during which the gate is open.

While the cam shaft 15 moves from the start to stop position in the clockwise direction, the hands at first are stationary as indicated by the shaded area, and dwell in their vertical position, shown in Figure 4 and indicated there by the reference character I. During this time the fruit is released from the chute 290 at about the point indicated by the dot and dash line in Figure 50 and drops into and is grasped by the right hand 38, under it.

The hands then start their rotary movement, moving from the position shown at I in Figure 4 to the position II where both hands grasp the fruit. During the latter part of this rotary movement, the hands are spread apart and again brought together as the rotary movement is completed. During the dwell ensuing, as shown by the timing chart, the knife is released to the cutting action at about the point indicated by the dot and dash line and the fruit is severed into two parts, one part grasped in each hand. After this operation is completed the hands are again rotated, each now grasping its part of the fruit until they reach the vertical position shown in full lines in Figure 4.

At this point they dwell in their rotary motion as indicated by the timing chart for almost half a revolution of the cam shaft, for it is during this period that they move vertically down on the reamers, dwell in their lowest position for a short length of time and then rise again to the position III shown in Figure 4. During this relative approach movement, the juice is extracted from the fruit.

The hands are then again rotated to the position IV shown in Figure 4 where they again dwell for a short period as indicated in the timing chart, during which period the ejection of the skin takes place. At this point it might be mentioned that the skins are ejected through openings 325 in the vertical plates 326 rising between the side walls of the cabinet and the main machine unit, and extending around the main unit at the rear to mask the rear portion of the cabinet, only the parts clear in Figure 1 being visible from through the glass panel 8. They drop down from this point through chutes 327, see Figure 25, into the lower part of the cabinet where they strike the inclined lateral chutes 327a on the main refuse receptacle 198 in the bottom of the cabinet and are guided thereinto.

After the ejection and the dwell during which it takes place the hands are again rotated to the vertical position I and the machine is stopped.

As indicated by the timing chart, by comparing the second circle with the one just described, it will be seen that the cup transfer from the cup dispenser 231 to the filling position is completed before the hands have descended upon the reamers and the juice is being extracted. This operation takes place under the action of the cup transfer cam 257 and the parts associated therewith. During the further vertical descent of the hands to extract the juice and during a part of the vertical rise thereof, the cup transfer lever is again returned to its position under the cup dispenser to receive another cup.

The cup pushout and refuse chute movements are indicated by the third circle of the timing diagram and comparing this with the first circle it will be seen that at the start of the cycle the refuse chute 185 is still in its forward position under the open strainer cup and the cup pushout is returning to its rearward position but does not reach this position until sometime after the start of the machine. By reference to the second circle it will be seen that it completes its movement to the rearward position behind the filling position before the cup transfer has advanced the empty cup to this position. The cup pushout remains stationary in this position as shown by the diagram during the vertical descent of the hands to extract the juice and during the greatest portion of their vertical rise. During the latter part of the vertical rise and the subsequent rotation of the hands to the ejection position IV and during the dwell in that position, the cup delivery moves forward to deliver the cup to the outside of the machine and at the same time the refuse chute moves forward under the strainer housing. During the last part of the machine cycle the cup delivery is returned to the rear of the gate but does not complete its rearward movement, as above pointed out, until the next cycle of the machine.

Referring to the timing diagram, the fourth circle indicates the timing of the movements of the strainer opening and closing pins. These pins are actuated by a crank pin 178 on the lower end of one of the intermittently rotated hand-rotating shafts 43, which makes one complete revolution at intervals during the cycle of the machine. By reference to the outer circle of the timing diagram, it will be seen that shaft 43 is stationary from the start of the vertical descent of the hands to the end of their vertical ascent and during this period the strainer pins as indicated by the fourth circle, are also stationary. From the starting point of the machine to the beginning of the vertical descent of the hands the strainer pins are moved by the rotation of the shaft 43 from their rearward open position to their forward closed position so that they are in position closing the bottom of the strainer housing during the period of the juice extraction and for some time thereafter. It is only when the hands begin to rotate to the ejecting position IV that the strainer rods are fully withdrawn to permit the refuse collected thereon to drop down through the refuse chute just prior to the completion of the machine cycle.

As shown by the fifth circle in the timing diagram by comparison with the second circle, the gate 212 is in the open position during the cup transfer to the outside of the machine and some time thereafter to permit the cup push-out mechanism to move inwardly far enough to clear the gate. During the remainder of the cycle the gate remains closed, being in closed position at the start and stopping of the machine.

The reamers 33 and the juice-collecting housings 37 surrounding them are of course continuously driven at high speed during the operation of the motor i. e. during the complete cycle.

Immediately after the return of the cup transfer lever to its position under its associated cup dispenser, the associated cup release actuated by the cam 233 and its associated spring is operated to release the cup from the associated dispenser. By reference to the second circle in the timing diagram, this release takes place approximately at the point indicated by the dot and dash line through the second circle at the point indicated.

From the foregoing description of the operation, it will be seen that the movements of most of the mechanisms are controlled either directly or indirectly from the main cam shaft 15, only the fruit feed from the charging hopper to the release chute 290 is controlled by a separate train of gearing from the motor shaft and of course the reamers and their surrounding housings are continuously driven by the motor during the machine cycle. This centralized control makes possible accuracy of timing and compactness of construction which are important considerations in the production of a practical machine of this class.

As before pointed out the machine is stopped by the opening of the switch 319—321 by the notch 318 in the disc 317 on the cam shaft as shown on the wiring diagram, see Figures 26 and 51. The opening of this circuit at this point de-energizes the lock up relay 328 in the motor circuit which normally holds the motor circuit, closed temporarily, by the relay 323 in the coin controlled circuit, closed at this point. Since the coin control circuit remains closed but momentarily the relay 323 operates merely to close the switch of the motor circuit, the lock up relay 328 then maintaining it closed until it is de-energized by the opening of the cam shaft control switch. As shown in the wiring diagram several lamps 329 may be provided in the motor circuit, these lamps being arranged at suitable locations in the cabinet to light up parts visible through the glass panel 8 at the front of the cabinet during the operation of the machine.

The used cup may be disposed of by dropping it through an opening 330, shown in Figures 33 and 38, provided in the bottom of the casting 211 through which the cup pushout opening extends. This opening is normally closed by a cover 331 hinged at the top on a pin 332 and pressed to its seat closing the opening by a spring 333 surrounding the pin and having its ends bearing respectively, against a transverse frame 3 supporting the casting and against the cover. A forwardly projecting spout 334 on the refuse container 198 and arranged just below this opening 330 guides the used cup into the refuse container in the bottom of the cabinet.

While the machine has been described herein as a full automatic machine adapted to be operated by a coin-control to process one fruit at a time at each dropping of a coin in the slot, and delivering the juice from said fruit to the customer without any hands having touched it, it is obvious that the main operations and their controlling mechanisms could be used in a machine which was but partly automatic in operation. Such means as the fruit feed and the cup delivery to the outside might in some cases be entirely dispensed with and the fruit fed and filled cup picked up by hand under the discharge spout leading from the juice collectors. Other and further modifications and variations would readily occur to one skilled in this art, and all such modifications and variations as fall within the spirit and scope of the invention in its broad aspects are intended to be included in the combinations and subcombinations defined in the appended claims.

What is claimed is:

1. In a fruit juice extracting machine, a main frame, a pair of reamers mounted on vertical shafts on said frame, a pair of hands for cooperation with the respective reamers in extracting the juice, each of said hands mounted for rotation in a vertical plane above a reamer and connected to a horizontal shaft extending at right angles to a reamer shaft, vertical shafts, one connected to drive each of said horizontal shafts, said vertical shafts being geared together for rotation in reverse directions, and means for intermittently rotating said vertical shafts whereby to intermittently rotate the hands, first, from a vertical fruit receiving position where the fruit is received and gripped by one of the hands, then to a horizontal position where the fruit is gripped by both hands and cut in two while so gripped, then to a vertical extracting position directly over the respective reamers, then to a skin ejecting position, and finally to the starting or fruit receiving position, said hands and reamers being relatively approached and separated during the dwell in the rotary movement of the hands at the extracting position and means for causing such relative approach and separation.

2. A fruit juice extracting machine comprising a main frame, carrying a pair of reamers mounted to rotate at high speed and means for rotating them, a pair of reversely rotating hands arranged to cooperate with said reamers to extract the juice from a fruit, means for giving said hands and reamers a relative approach and separation movement to extract the juice and to recede from each other, means for giving the hands an intermittent reversely rotary movement, first, from a fruit receiving position in which a fruit is gripped by one of said hands, then to a cutting position where the fruit is gripped by both hands, then to the juice extracting position opposite the respective reamers, then to a skin ejecting position and finally to the fruit receiving position again, a knife and means for actuating said knife to cut the fruit in two, ejecting means carried by the hands and means for actuating the ejecting means at the ejecting position, and a pair of juice collector housings surrounding the respective reamers and having parts rotating with said reamers to sweep the extracted juice to outlets adapted to communicate with a common cup, the means for operating all said parts including a motor and a cam shaft controlling and timing all of said operations except the reamers and the rotating parts of the juice collector housings, the latter being driven continuously during the operation of the motor.

3. A fruit juice extracting machine comprising a main frame, a pair of reamers mounted on vertical shafts in said frame, a pair of hands mounted in the frame for rotation above their respective reamers and in the plane of the reamer axes, a knife mounted on the frame for movement between said hands, means for rapidly rotating the reamers, means for intermittently reversely rotating the hands after a fruit has been gripped by one of them in their upper fruit receiving position to a horizontal position in which both hands grip the fruit, means for actuating the knife to cut the fruit in two at this point in the rotation of the hands, said rotating means then rotating the hands with each gripping its part of the fruit to a vertical position directly above the reamers, means for causing a relative approach of the hands and reamers to extract the juice from the two parts and for causing the relative retraction of the hands and reamers after the extraction of the juice, means for collecting the juice surrounding the reamers and having parts rotating therewith for sweeping the juice around to a discharge port emptying into a cup common to the two reamers and their collecting means, the rotating means again rotating the hands to an ejecting position, means for ejecting the skins from the hands in such position, and the rotating means finally rotating the hands to the starting position.

4. In a fruit juice extracting machine, a pair of reamers, a pair of fruit-gripping hands rotatable on axes, respectively, in the plane of the reamer axes, means for rotating said reamers, means for intermittently reversely rotating said hands, first, from a fruit receiving position to a fruit cutting position wherein both hands grip the fruit, then to a position directly in line with their respective reamers, then to a skin ejecting position, and finally to the starting or fruit receiving position, the intermittent rotating means causing a prolonged dwell in the rotary movement of the hands in their position in line with the reamers, means for causing a relative approach movement of the hands and reamers to extract the juice during said dwell and for causing a relative receding movement after the extraction of the juice, and means for cutting the fruit while gripped by both hands in the cutting position, said cutting means being operated independently of the movement of the hands.

5. In a fruit juice extracting machine, a reamer and means for rotating same, a fruit gripping hand rotatable on an axis in the plane of the reamer axis, means for rotating said hand intermittently, first, from a fruit gripping position to a cutting position, a knife and operating means therefor for cutting the fruit while the hand dwells in this position, then rotating the hand from this position in which it grips one part of a cut fruit to a position directly in line with the reamer, said intermittent rotating means causing a prolonged dwell of the hand in this position and means for causing a relative approach of the hand and reamer during said dwell to extract the juice and to cause a relative receding of the hand and reamer after said extraction.

6. In a fruit juice extracting machine, a reamer and means for rotating the same, a hand for gripping the skin of a part of a fruit previously cut in two, means for causing a relative approach of the hand and reamer for extracting the juice, and sharp inclined projections on the hand for penetrating the skin of the fruit to hold it against rotation under the torque of the reamer while the juice is being extracted, and additional gripping means operable independently of the projections engaging the fruit outwardly of the sharp projections.

7. In a fruit juice extracting machine, a hand adapted to grip a fruit part from which the juice is to be extracted, a reamer in cooperative relation to said hand and means for rapidly rotating it, means for relatively approaching the hand and reamer for extracting the juice from a fruit part so gripped, said hand having two sets of gripping means independent of each other, one of said means comprising inclined sharp projections arranged to penetrate the skin and positively hold the fruit part against rotation under the torque of the reamer.

8. In a fruit juice extracting machine, a reamer and means for rotating it, a hand having a cup-shaped recess adapted to receive therein a tough-skinned fruit part from which the juice is to be extracted, a plurality of spring fingers on said hand adapted to grip the fruit part adjacent the rim of said recess, the reamer being dome-shaped and adapted to be received within the recess of the hand with sufficient clearance to accommodate the skin between it and the walls of said recess, means independently of said fingers comprising inclined sharp points projecting from the walls of said recess for penetrating the skin of a fruit and prevent its rotation under the torque of the reamer, and means rending said spring fingers inoperative during the relative approach of said hand and reamer to extract the juice.

9. In a fruit juice extracting machine, a pair of reamers rotating at high speed and means for rotating them, a pair of reversely rotating hands arranged to cooperate with said reamers to extract the juice from a fruit, means for giving said hands an intermittent reversely rotary movement from a fruit receiving position to a cutting position, then to an extracting position, and finally to the starting or fruit receiving position, the hands being further mounted for relative approach and separation movements with respect to the reamers when in the extracting position and means for so moving them, the hands being additionally mounted for spreading and approach movements to and from each other and means for affecting such spreading and approach movements, respectively, immediately before and after the cutting operation and a common control means for controlling and timing all of said movements of the hands.

10. In a fruit juice extracting machine, a main frame, a pair of reamers mounted on vertical shafts in said frame and means for rotating the same, a pair of hands for cooperation with said reamers, each mounted to rotate in the plane of its associated reamer axis on an arm projecting laterally from a vertically extending sleeve mounted to reciprocate in the main frame, a vertical shaft in each said sleeve geared to a horizontal shaft in the associated arm for rotating said hand, the vertical shafts of the hands being geared together to rotate at the same speed in reverse directions, each sleeve being surrounded by a collar rotatably mounted in the machine frame and keyed to the sleeve in a manner to permit relative reciprocatory movements of the sleeves, and the rotary movements of said collars being controlled and timed from a common shaft in the machine frame.

11. In a fruit juice extracting machine, a pair of hands mounted on opposite sides of the machine for reverse rotation in a common plane, means for intermittently rotating said hands from a receiving position where a fruit is gripped by one of said hands to a cutting position in which the hands are in opposed relation each gripping the fruit, a knife mounted on an axis paralleling the plane of rotation of the hands and adapted to swing between the hands in the cutting position to cut the fruit in two, a spring for actuating said knife, the connections between the spring and knife and their relation to the cutting edge being such as to deliver the maximum force to the knife during the time when the knife encounters its maximum resistance in passing through the fruit.

12. In a fruit juice extracting machine, a pair of hands mounted on opposite sides of the machine for reverse rotation in a common plane, means for intermittently rotating said hands from a receiving position where a fruit is gripped by one of said hands to a cutting position in which the hands are in opposed relation each gripping the fruit, a knife mounted on an axis paralleling the plane of rotation of the hands and adapted to swing between the hands in the cutting position to cut the fruit in two, spring means for actuating the knife, means for cocking the spring means and releasing it to actuate the knife when the hands are in the cutting position, said knife actuating and hand rotating means being controlled and timed by a common cam shaft.

13. In a fruit juice extracting machine, a pair of hands mounted on opposite sides of the machine for reverse rotation in a common plane, means for intermittently rotating said hands from a receiving position where a fruit is gripped by one of said hands to a cutting position in which the hands are in opposed relation each gripping the fruit, a knife mounted on an axis paralleling the plane of the rotation of the hands and adapted to swing between the hands in the cutting position to cut the fruit in two, spring means for actuating said knife, said spring means being constructed and arranged to deliver a succession of thrusts to the knife in its passage through the fruit, the first operative to drive the knife well into the fruit, whereupon a second and heavier thrust is delivered to drive the knife through the fruit, and means for cocking said spring means and releasing it to its action when the hands are in the cutting position.

14. In a fruit juice extracting machine, means for holding a fruit firmly in the cutting position comprising a pair of hands gripping the fruit on opposite sides thereof, a knife mounted to swing between said hands to cut the fruit in two, spring means for actuating the knife, and means for cocking and then releasing said spring means to actuate the knife, said spring means being constructed and arranged to deliver a succession of thrusts of increasing intensity to the knife during its passage through the fruit.

15. In a fruit juice extracting machine, a rapidly rotating reamer for extracting the juice from a fruit part pressed thereagainst, a juice collecting housing surrounding said reamer and having a part rotatable with the reamer and arranged to throw the juice and pulp collected on its walls radially outwardly, a fixed member surrounding said movable housing and provided with a channel into which the periphery of said movable part projects, the peripheral portion of said rotating housing part being open radially outwardly to permit the juice to pass into said channel, and spaced radial vanes connected to the peripheral portion of said rotating housing part and conforming to the shape of said channel and arranged to sweep the juice from said channel to an injection port arranged at one point of its periphery and communicating with said channel, the channel being widened radially as it approaches said port.

16. In a fruit juice extracting machine, a rapidly rotating reamer for extracting the juice from a fruit pressed thereagainst, a juice collecting housing having a part rotating with the reamer and a peripheral fixed part formed with a radially inwardly facing channel into which the peripheral portion of the rotating part projects, the rotating part being formed to catch the extracted juice and pulp and throw it centrifugally into said channel, and means associated with the peripheral portion of said rotating part and conforming to the cross-section of the channel for sweeping the juice and pulp from the channel into a radially widened portion thereof communicating with a discharge spout.

17. In a fruit juice extracting machine, a rapidly rotating reamer and means to rotate it, a housing surrounding the reamer having a central portion connected to rotate therewith and a peripheral fixed portion having a channel into which the juice and pulp is thrown centrifugally by the rotating portion during its extraction by the reamer, and means connected to the peripheral said rotating portion of the housing and conforming to the cross-section of the channel sweeping the juice from the channel into a discharge passage communicating with the channel in the fixed portion.

18. In a fruit juice extracting machine, a reamer and means for rotating it, a hand adapted to grip a fruit part from which the juice is to be extracted and mounted to rotate in the plane of the reamer axis, means for intermittently rotating said hand from a fruit receiving and gripping position to an extracting position opposite the reamer, means to cause a relative approach and separation of said hand and reamer in said extracting position, said rotating means then turning the hand to an ejecting position where the skin of the fruit is ejected, means associated with said hand for ejecting the skin, means for storing energy to operate said ejecting means in the rotation of said hand to the ejecting position, and means for suddenly releasing said energy-storing means in said position.

19. In a fruit juice extracting machine, a hand rotatably mounted in an arm projecting from the machine frame and adapted to receive and grip a fruit in one position of rotation, means for intermittently rotating the hand from said gripping position, successively to an extracting position, then to an ejecting position, and finally to return it to the receiving position, an ejection plunger part associated with the hand, a spring for actuating said ejector, and a cam on said arm cooperating with a cam follower on said plunger part for tensioning the plunger actuating spring during part of the rotation of the hand and releasing it at the ejecting position to operate the plunger part to eject the skin of the fruit.

20. In a fruit juice extracting machine, a rotatably mounted hand for gripping a fruit, gripping fingers and a skin ejecting plunger associated therewith, means for intermittently rotating said hand from a fruit receiving position to an extracting position, then to an ejecting position and finally again to the fruit receiving position, the ejecting means cooperating with the gripping means to move said gripping fingers to inoperative position during the ejection of the skin of the fruit, and thereafter retain said fingers in said inoperative position until a new fruit is presented to the hand which resets the ejection means and releases the gripping means to its gripping action, the ejection means being rendered operative to eject the next fruit skin by the rotation of the hand from the ejecting position and means for automatically releasing the ejecting means to its ejecting action when the hands reach the ejecting position.

21. In a fruit juice extracting machine, a pair of reamers rotating at high speed and means for rotating them, a pair of reversely rotating hands arranged to cooperate with said reamers to extract the juice from a fruit, means for giving said hands an intermittent reversely rotary movement from a fruit receiving position in which the fruit is gripped by one of the hands to a cutting position in which the fruit is gripped by both hands during the cutting operation, and then to a juice extracting position opposite the respective reamers, and means for giving said hands a spreading movement away from each other independently of their rotary movement during the last of the movement to the cutting position and for again returning them toward each other in said position prior to the cutting operation, and again starting a similar spreading movement before the rotating means starts them toward the extracting position, and return them again toward each other in such rotating movement to the extracting position.

22. In a fruit juice extracting machine, a main frame, a cam shaft mounted in said frame, a knife and a pivoted mounting therefor, a spring means for actuating said knife, a link connecting said mounting means and frame, a reciprocating member carrying a cam follower pivotally connected to said link, and a cam on said cam shaft engaged by said cam follower, said cam tensioning the knife spring means and having a sudden drop off to release the spring means to actuate the knife.

23. In a fruit juice extracting machine, a main frame, a cam shaft mounted in said frame, a pair of sleeves paralleling said cam shaft and mounted for vertical reciprocation in said frame, fruit receiving hands one mounted on each of said sleeves, a pair of rotating reamers, said hands being adapted to be moved toward and from said rotating reamers by the reciprocatory movement of said sleeves, and a cam on said cam shaft and a member pivoted to the frame and connected to said sleeves and having a follower engaging said cam to impart reciprocatory movement to said sleeves.

24. In a fruit juice extracting machine, a main frame, a cam shaft mounted in said frame, a pair of sleeves carrying fruit gripping hands paralleling said shaft and mounted in said frame for rotary movement, lateral arms keyed to said sleeves, and a sliding member carrying a cam follower connected to said arms, a cam on said shaft adapted to cooperate with said cam follower to reciprocate said member and rock said sleeves in one direction and a spring associated with said sliding member to hold said follower against the cam and rock said sleeves in the opposite direction.

25. In a fruit juice extracting machine, a main frame, a driven main shaft mounted in said frame, a pair of sleeves paralleling said shaft mounted for reciprocation in said frame, and each carrying a rotary hand for gripping a fruit, means for rotating said hands in reverse directions including shafts extending through said sleeves, and means for intermittently rotating said hands interposed between said driven main shaft and said sleeve surrounded shafts.

26. In a fruit juice extracting machine, a main frame including a main casting, a transverse plate secured to the top of the front portion of said main casting, said plate supporting a pair of juice collectors arranged symmetrically on opposite sides of the frame, a pair of reamers mounted in the frame below said plate and projecting thereabove into position where each is surrounded by an associated juice collector and arranged centrally thereof, and a pair of vertically reciprocating hands for cooperation with said reamers also mounted in the frame and arranged symmetrically on opposite sides of the machine in line with the respective reamers, said hands being rotatable from a fruit-cutting position, in which both grip a fruit to be cut, to the position in line with the respective reamers.

27. In a fruit juice extracting machine, a main frame, a vertical main shaft supported in the rear of said frame, a pair of fruit-receiving hands, a pair of vertical hand-rotating shafts mounted in said frame forwardly of said main shaft and symmetrically located on opposite sides of said main shaft, a pair of reamers cooperating with said hands, and a pair of vertical reamer-operating shafts mounted in said frame forwardly of said hand-rotating shafts and also symmetrically arranged on opposite sides of the main shaft, a transverse shaft mounted in the forward portion of said frame connected to drive the reamer shafts, a sleeve shaft on said transverse shaft connected through reduction gearing to drive the main shaft and intermittent driving means interposed between the main shaft and the said hand-rotating shafts.

28. In a fruit juice extracting machine, extracting means including a hand open upwardly to receive a fruit in a fruit receiving position and rotatable during a cycle of the machine to return to said receiving position, a fruit feeding means having an opening directly above said hand and feeding by gravity into said hand, means to release one fruit at each cycle of the machine to drop into said hand, and gripping means carried by said hand and normally held in inoperative condition, means for so holding it said holding means being released by the drop of the fruit into the hand to firmly grip the same.

29. In a fruit juice extracting machine, extracting means including a hand rotatable in a machine cycle from an upwardly open fruit receiving position to return to said position at the end of the cycle, a fruit supply reservoir above the hand and transfer means to transfer a fruit from said reservoir to the hand for each cycle of the machine, said transfer means comprising gravity means feeding one fruit at a time to an elevator shaft, an elevator in said shaft and means for operating it to raise the fruit to the top of the elevator, a gravity feed chute leading from the top of said elevator to an opening directly above said hand in the fruit receiving position, and means for releasing the fruit one at a time from said gravity chute to drop through said opening into the hand, all of said transfer means being operated in suitably timed relation for each cycle of operation of the machine.

30. In a fruit juice extracting machine, means for gripping the opposite sides of a fruit in a cutting position, a knife associated with said gripping means to cut the fruit in two when so held, actuating means for the knife, the cutting edge of the knife being substantially V-shaped and arranged to have the apex of the V enter the fruit foremost in the cutting operation, one of the sides of the V being concave and the other convex and cutting the fruit with a slicing action, whereby the cutting operation can be cleanly achieved with a minimum of power.

31. A fruit juice extracting machine comprising a fruit-gripping hand adapted to be rotated about an axis of rotation to receive a fruit in a position in line with said axis, and thereafter to be rotated in a stepwise manner to a position at which the fruit is cut in half, a position at which the juice is extracted by a rotatable reamer, and a position at which the empty fruit skin is discharged, said rotatable reamer being positioned in the plane of rotation of the fruit-gripping hand and having associated therewith a rotatable juice collector for collecting and discharging the extracted juice.

32. In a fruit juice extracting machine, a reamer and means for rotating it at high speed, means for pressing a fruit part against the reamer for extracting the juice, means surrounding said reamer for collecting and discharging the juice through a discharge passage, a receptacle for catching the juice mounted on a platform below said discharge passage, a strainer housing through which the juice passes in its discharge to the receptacle, said strainer housing being normally closed during the passage of juice by closely spaced parallel slidable series of pins to catch the seeds and other refuse, scraping means for said pins, said pins being slidable to open position in contact with said scraping means after the juice has passed through the strainer housing, to discard said seeds and other refuse strained out by said pins, and means for effecting such sliding movement of said pins.

33. In a fruit juice machine of the class described, a strainer housing, means for passing the juice through said strainer housing before it is discharged into a receptacle, said strainer housing being partially closed during passage of the juice by a closely spaced parallel series of slidable pins whereby seeds or other refuse are adapted to be intercepted, and said pins being adapted to slide to open position after the juice has passed through the strainer housing, and means cooperating with the pins in such movement to scrape the seeds or refuse intercepted by said pins off the pins for discharge through the bottom of the housing.

WILLIAM A. WEIGHTMAN.
WALTER HURLEMAN.